United States Patent [19]

Eberhardt

[11] Patent Number: 4,818,416
[45] Date of Patent: Apr. 4, 1989

[54] METHOD AND APPARATUS FOR TREATING BODIES OF WATER

[76] Inventor: Thomas E. Eberhardt, 220 Blenheim Dr., Easton, Pa. 18042

[21] Appl. No.: 199,314

[22] Filed: May 26, 1988

Related U.S. Application Data

[63] Continuation-in-part of Ser. No. 75,114, Jul. 20, 1987, Pat. No. 4,747,958.

[51] Int. Cl.⁴ .............................................. C02F 1/68
[52] U.S. Cl. .................................. 210/749; 210/198.1; 210/242.1
[58] Field of Search .............. 210/749, 752, 753–763, 210/241, 747, 242.1, 198, DIG. 1; 114/61; 429/2, 47

[56] References Cited

U.S. PATENT DOCUMENTS

| | | | |
|---|---|---|---|
| 3,942,457 | 3/1976 | Keyes et al. | 114/61 |
| 4,072,798 | 2/1978 | Sisler et al. | 429/2 |
| 4,208,283 | 6/1980 | Brouzes | 210/754 |
| 4,374,133 | 8/1982 | Brigante | 210/752 |
| 4,507,206 | 3/1985 | Hughes | 210/709 |
| 4,518,506 | 5/1985 | Green et al. | 210/747 |
| 4,530,765 | 7/1985 | Sabherwal | 210/747 |
| 4,551,244 | 11/1985 | Inove | 210/198.1 |
| 4,747,958 | 5/1988 | Eberthardt | 210/749 |

OTHER PUBLICATIONS

Patent Search Results, (Key Word Computer Search).
Living Lakes, (House brochure of Living Lakes, Inc.).
Living Lakes News—Living Lakes Membership News Letter vol. 1, No. 1—Jul. 11, 1986.
Living Lakes News—Living Lakes Membership Newsletter, vol. 1, No. 2, Sep. 15, 1986.
MPMs Limestone Fights Effectives of Acid Rain in Troubled Waters, pp. 6–9, "Pfizer Scence", Nov. 1986.
Chapter 5, "Phosphorus Precipitation and Inactivation" of Text, Lake and Reservoir Restoration by G. Dennis Cooke et al., Butterworks.

*Primary Examiner*—Frank Sever
*Attorney, Agent, or Firm*—Charles A. Wilkinson

[57] ABSTRACT

A method of treating bodies of water such as lakes to correct chemical, biological or other imbalances in the aquatic environment by accurately dispensing a treatment agent into the water in an amount based upon the volume of water being passed over and continuously determined by detection means for the speed of the boat or vessel carrying the dispensing means and the depth of the water being passed over. When the water is being neutralized by a chemical addition, the pH of the water may also be continuously monitored. A boat particularly designed and adapted for practicing the method is also disclosed. The boat includes a main tank partially supported or floated by the water at least when the tank is loaded and also stabilized and partially or additionally supported by lateral inwardly and outwardly adjustable pontoons when loaded. The boat includes sparging, or mixing, and above or below water dispensing means to dispense the treatment agent.

3 Claims, 10 Drawing Sheets

METHOD AND APPARATUS FOR TREATING BODIES OF WATER

CROSS REFERENCE TO RELATED APPLICATION

This application is a continuation-in-part of U.S. application Ser. No. 075,114 filed July 20, 1987, now U.S. Pat. No. 4,747,958.

BACKGROUND OF THE INVENTION (1) Field of the Invention

This invention relates to the treatment of bodies of water such as lakes with various treatment agents to improve the quality of the water or alleviate other undesirable aquatic conditions. More particularly, the invention relates to the accurate application of chemical, biological and other treatment agents to bodies of water by the use of floating platforms such as boats and the like. More particularly still, the invention provides an apparatus and method for applying such treatment agents to bodies of water on a uniform and effective basis designed to overcome or mitigate undesirable chemical or other conditions or balances, i.e. to correct predetermined chemical, biological and other imbalances in such bodies of water. The invention involves concurrent detection of parameters by which the volume of water and/or the area of the bottom to be treated is accurately and substantially continuously determined and application of the treatment agent is controlled.

(2) Description of the Prior Art

In recent years, various problems with pollution and other deleterious imbalances in various aquatic environments have become of major concern. One such environmental problem has been that of lake acidification. Lake acidification results largely from so-called "acid rain" which recently has become increasingly serious. While acidification problems are not new and a variety of techniques have been employed in the past to counteract the adverse effects of excess concentrations of acid in lakes and other bodies of water, the problem in recent years has become particularly acute in the industrialized nations. This is due in large part, it is believed, to the increasing use of combustion processes, and particularly those combustion processes which use high sulfur fuel. Coal and oil, which are ultimately derived from biological residues, frequently contain fairly high levels of sulfur derived not only from the original biological material, but in addition to sulfur brought in from various sources and especially by perculating sulfur compound laden water. Such sulfur compounds are oxidized when the fuel is burned and the sulfur oxides generated pass into the atmosphere where they are dispersed, particularly down-wind. Upon subsequent precipitation from the atmosphere, particularly during rain and the like, such sulfur oxides are combined with atmospheric moisture to form sulfurous, sulfuric and other sulfur acids which give rise to multiple detrimental effects, including damage to biological systems, both in the air and in the water, general deterioration of the environment, progressive destruction of man-made structures and the like.

In addition to sulfur compounds which are given off by the burning of fossil fuels, high temperature combustion processes also form the so-called NOX gases, i.e. the various nitrogen oxides including $NO, NO_2$ and the like, which upon being washed or precipitated from the air with moisture in the form of rain, snow and mist also form acid solutions which have detrimental environmental effects. Since precipitation in the form of rain ultimately collects in ground water and natural bodies of water such as lakes and the like, such bodies of water tend to suffer from an increasing content of both sulfur and nitrogen acids with serious detrimental effects upon the flora and fauna of the aquatic environment. While lakes and other bodies of water are normally slowly neutralized by natural processes, particularly in limestone regions, the continued receipt of acidified precipitation into such lakes and other bodies of water frequently proceeds at a faster rate than the natural neutralization of the acid within such bodies of water. Small degrees of acidification harms aquatic organisms through the inhibition of reproduction and growth, and in more extreme cases, causes almost complete mortality. In addition, the acidification of lakes, streams and other bodies of water increases the soluble aluminum content of the water which is particularly harmful to young fish. The solubility of other toxic metals such as copper, cadmium, mercury, lead and the like heavy metals is also increased by excessive acidity with detrimental results to acquatic and marine life in general. The acidification of lakes and other bodies of water, even of a fairly small degree, can also very seriously affect the ecological balance in such bodies of water with serious environmental and economic effects.

The acidification of lakes, streams and other bodies of water, is as noted above, not a new phenomenon. However, it is an increasingly serious phenomenon. In the past, a variety of techniques have been employed to counteract or mitigate the adverse effects of excess concentrations of acid in bodies of water. For example, American farmers may use millions of tons of neutralizing agents every year to counteract the acidity produced by nitrates and sulfates in chemical fertilizers. Furthermore, since the middle of this century, governmental agencies and private groups in the United States have used a variety of neutralization techniques to protect fish production in acid lakes and other aquatic environments. The problem with acid lakes has been particularly severe in the Eastern United States and the Scandanavian Peninsula in Europe. The reason for the particular problem in both these areas is the fact that they receive prevailing winds from other industrialized areas and a considerable amount of precipitation, all of which tends to remove acid components which have entered the atmosphere in other regions from both industrial and transportation combustion processes used in such regions. Since, as indicated above, acidified waters tend to collect in lakes, unless there is a continuous neutralization of such waters, the lakes tend to become increasingly acidified, often to the point where not only native plants and fish are killed, but essentially all but very specialized organisms are very adversely affected, if not completely destroyed.

While a large proportion of the acid lake problem is due to so-called acid rain, as explained above, other industrial and agricultural practices also add to the acid lake problem. For example, nitrogen and sulfur containing fertilizers may leach into the ground water or run off into natural bodies of water resulting in detrimental acidification of such bodies and poisoning of desirable organisms. Sulfur acids may also form in coal seams which have been opened and exposed to the atmosphere as well as to water from various sources and may also be formed from the iron pyrites or iron sulfur compounds in waste coal or culm piles and then leached into surface and ground waters.

While acid rain and the resulting lake acidification presently constitute one of the most widely recognized or notorious chemical imbalance problems in lakes and other bodies of water, other chemical and biological imbalances are equally, if not more, important. Chief among these, and perhaps the second most widely known, is so called eutrophication, or algal bloom, caused by excess nutrients in a lake. Such excess nutrients include the various chemical elements and compounds such as carbon dioxide, oxygen, nitrogen, phosphorus and minerals required for biological growth. An excess of such growth nutrients very frequently results in dramatic and, in effect, out of control overgrowth of certain acquatic organisms such as algae. Such overgrowth frequently chokes out essentially all other organisms and can become so severe that the overgrown or overblooming organism poisons itself with its own metabolic products. This can result in great quantities of decaying organic refuse which essentially poisons the waters for other organisims other than putrifactive type organisms.

Excessive discharge of organic materials such as sewage and the like into a lake or other body of water can provide so much of the essential nutrients which algae, plants and other aquatic organisms require that very excessive algal growth can occur with disasterous esthetic and ecological results. A clear pristine lake can in such manner be within a very short period converted into a choked swamp. Severe algal overgrowth may also result in serious depletion or even complete removal of essential nutrient elements from the water with resultant mortality of a balanced aquatic population and eventual death and putrification even of the overgrown algae due to lack of essential nutrients.

Water run off from inorganically fertilized farm lands can not only cause detrimentally acid aquatic conditions, but can also cause eutrophication due to excessive nutrients entering the water. Organic fertilizer run-off may also result in eutrophication in nearby waterways.

Control of eutrophication is usually accomplished by controlling one of the more essential nutrients, usually phosphorus, which is relatively scarce, but very essential, and thus more easily controlled than some of the other more common essential nutrients. Even when the phosphorus content of the water is controlled, however, residual phosphorus can be released from sediments already in the lake, prolonging the enriched state and supporting continued algal bloom or eutrophication.

Lakes and other bodies of water may also acquire other types of chemical imbalances, one frequent one being over basicity or alkalinity caused by excessive content of basic substances such as in particular, calcium carbonate derived from limestone and lime fertilizers. In hard water region lakes, a so-called "whiting" phenomenon sometimes occurs in the warmer productive periods of the year. Such "whiting" is caused by calcium carbonate precipitation which causes major increases in turbidity of the water, deleteriously affecting water quality. In such cases, it may be necessary to add acid or acidic materials to the water to counteract the basicity. Such acid materials obviously must be carefully added to prevent over-acidification resulting in the same problems as that caused by acid rain and the like.

Other additions which may be made to lakes and other bodies of water at various times may be algacides, such as copper sulfate, to kill excessive algae, fertilizers to encourage the growth of photosynthetic and other fish food, general or specific herbicides to kill excessive or deleterious multicellular plant growth, disinfectants or poisons to sterilize a body of water and other treatment agents for various specialized purposes.

One method of counteracting the acid rain and acid lake problems is by neutralization of the affected lakes and other bodies of water by various neutralizing agents. Rehabilitation of surface waters has been experimentally practiced with a number of reagents, including lye, sodium carbonate, calcitic and dolomitic limestones, hydrated lime, quicklime and slurried industrial slags, which are essentially calcitic or dolomitic lime material. Calcitic limestone has proved for a number of reasons to be the material of choice, particularly since it is readily available and relatively cheap. Calcitic limestone is comprised primarily of calcium carbonate and is a natural solution component of many lakes and streams where it acts as a buffering agent. Calcitic limestone also has a moderate reactivity which protects fish against so called pH shock. It may also be relatively easily prepared in slurries or solutions applicable to a variety of acidic conditions.

Slurries and solutions of calcitic limestone, usually in the form of a slurry, have been applied to lakes and other bodies of water by means of boats and by helicopters, usually by spraying the slurry from a hose into the body of water. Normally the pH of the body of water is first established and the volume of water in such body is at least roughly estimated or determined, after which the amount of calcium slurry necessary for application to the body of water in order to neutralize the acid content of the water is calculated. Refinements of the basic neutralizing agent application process have included division of a body of water arbitrarily into a number of zones and measurement of the depth of the water in each of such zones whereupon an amount of neutralization agent may be applied to each zone calculated to effect the desired raising of the pH of the water in such zone. The pH reading, of course, is a measure of the hydrogen ion content of the water. A further refinement has been the use of coarser particles of calcitic material in a limestone slurry to penetrate deeper portions of a lake or other body of water. The larger particles resist complete dissolution in the water before they reach the bottom.

It can be readily seen from the description above that the liming or neutralization of an acid lake is no small undertaking. The neutralization agent cannot be applied heedlessly to such body of water because of the cost and since the production of too basic an environment in the water may frequently be almost as harmful to aquatic life as too acid an environment. In fact, eutrophication of lakes by excessive contents of phosphates and other growth-accellerating ingredients may be accentuated by overliming of such bodies of water. Furthermore, while limestone particles which settle to the bottom of the average lake tend to sink into the bottom mud or ooze and are thus effectively removed from further affecting the basicity of the overlying water, excessive bottom limestone is thought to adversely affect adjacent aquatic plant life.

It is also undesirable to have zones of different acidity or pH in a lake, since aquatic life traveling from one zone to another may be deleteriously affected. Fish especially, and game fish, in particular, tend to be adversely affected by so-called pH shock engendered by quick changes in the pH of their environment. Zoning and stratification of pH zones in lakes is often accentuated by the slow mixing of the waters of such lakes. Consequently, it has been found very difficult to effect a uniform and accurate liming of bodies of water by the equipment and techniques heretofore used or available. This has been so, in spite of the fact that very great care is taken in the liming of lakes to try to obtain a uniform application of the liming or neutralization material, i.e. the aim is to apply a uniform amount of material to a uniform volume of water. In most cases, this has been done by first drawing up a topographical map of the lake to be treated using soundings or measurements of the depth of the lake taken in many places throughout such lake. A grid is then placed over this map and the lake is divided into zones based on the average depth of such zones. From this topographical map, the volume of the water in such zones is calculated. Next, the amount of material required for each zone for neutralization of the water in such zone is determined from the volume of water, the acidity measurements of the lake, and the neutralization value of the chemical which is to be applied to the lake. The neutralization material is then applied to the lake waters, usually from a boat or a helicopter in conformance with, or as much in conformance with as is possible, these predetermined calculations.

In actual practice, the treatment zones are usually marked in the lake by placing buoys at stratigic boundries thereabout, whereupon each zone can be treated with the precalculated amount of neutralization material. A slurry of neutralization agent in which the particles are of approximately the size which will dissolve completely as they settle from the surface to the bottom of the lake is then prepared. If the water, however, turns out to be deeper than expected, the particles may dissolve before they reach the bottom, leaving a bottom volume which has not been neutralized. Since bottom water in a lake very often is either not changed or infrequently changed by mixing, this unneutralized portion may persist for many weeks or even months. On the other hand, if the size of the particles of the slurry are too large for the depth of the water, such particles may not dissolve by the time they reach the bottom of the lake, but will settle onto the bottom and either be lost in the bottom debris or mud or form an over-neutralized zone along the bottom. This over-neutralized zone will also tend to persist over long periods due to non-mixing of the bottom waters.

In the control of eutrophication of lakes and the like, as stated earlier, the choice method of control is by limiting the availabllity of phosphorus in the water. Assuming it is not possible to limit the overall nutrient load entering the water from outside sources, without which there would not usually be a problem in any event, it is usually impractical, if not impossible, to limit the entrance of phosphorus into the lake or other body of water. It is thus necessary in order to control the phosphorus in the water to remove such phosphorus by precipitation, flushing or the like. The method of choice is frequently precipitation by the use of aluminum bearing materials because the formation of the resulting insoluble precipitate is not generally reversible with changed oxidation conditions and the complexes and polymers formed are also effective in removing particulate and inorganic phosphorus. Additions of aluminum compounds has been practiced in the United States and Sweden since at least 1970. The aluminum bearing materials, such as the frequently used alum, or hydrated aluminum sulfate, react chemically with the phosphorus in the water to form insoluble aluminum phosphates which precipitate, thus becoming unavailable for use. The pH of the water when the alum is added largely determines the composition of the material which precipitates. For example, when aluminum sulfate plus sodium aluminate is added to a lake, the solution pH dictates the formation of an aluminum hydroxide floc (a fine fluffy mass of particles or the like) which will settle to the bottom. As the aluminum hydroxide floc settles, phosphorus in the water column through which the floc passes is removed as aluminum phosphate precipitate, by absorption of phosphorus on the surface of the aluminum hydroxide polymer or floc and by entrapment and sedimentation of phosphorus containing particulate matter in the floc. The phosphorus is then trapped with the floc in the sediments at the bottom of the lake.

A number of other chemical reagents can be used to precipitate phosphorus such as sodium aluminate, aluminum hydroxide, clays and other aluminum bearing materials as well as lime products which can also form insoluble phosphates and some iron compounds. However, as indicated the use of alum plus preferably sodium aluminate is the method of choice.

A number of other treatment materials may also be added to lakes and other bodies of water for various reasons. For example, it may be desirable to add fertilizers, herbicides and other materials to aquatic environments to redress various possible imbalances in the aquatic environment.

OBJECTS OF THE INVENTION

It is an object of this invention, therefore, to provide a method of applying treatment materials such as neutralization and other chemical or biological imbalance redressing materials to a lake or other body of water in a more accurate manner than could heretofore be accomplished.

It is a further object of the present invention, to provide a method of applying a treatment agent such as a neutralization or other chemical or biological imbalance redressing agent to a lake or the like in accordance with a simultaneously calculated plan of application.

It is a still further object of this invention to provide an apparatus arrangement which may apply a carefully controlled and simultaneously calculated amount of treatment agent such as a neutralization or other chemical imbalance redressing agent to a lake or other body of water.

It is a still further object of this invention to dispense neutralization agents, eutrophication reducing agents, acidifying agents, and other chemical and biological imbalance redressing agents to a body of water in a carefully controlled manner both on a volumetric and/or a bottom area basis.

It is a still further object of this invention to provide an apparatus assembly which is especially and appropriately adapted to the application of a slurry of calcitic limestone to a body of water in an accurately measured, expeditious and efficient manner by a readily portable application apparatus.

It is still further object of this invention to provide a method for accurately providing an environmentally effective amount of a treatment material to the bottom of a lake or other body of water based upon the area of the bottom.

It is a still further object of this invention to provide an improved vessel for dispensing treatment agents to a lake or other body of water.

Other objects and advantages of the invention will become evident upon review of the following description and explanation of the invention in conjunction with the appended drawings.

SUMMARY OF THE INVENTION

The present invention effectively obviates many of the disadvantages of prior methods and means for the application of treatment agents such as neutralization agents, eutrophication counteracting agents or other chemical or biological treatment agents to a body of water such as a lake or the like. In accordance with the invention, a vessel designed to carry the treatment agent and apply it in an accurately measured amount to the lake is equipped to measure simultaneously its own progress over the surface of the lake and the depth of the water beneath the vessel. The depth and speed of the vessel are integrated together with the width of the application path provided by the vessel to determine the volume of water being passed over by the vessel in any given period of time. This information is then, along with other information such as the pH of the water, used to control the rate at which the treatment agent is applied to the lake or other body of water. By thus measuring the depth of the water as the vessel is guided along its predetermined distribution path, and integrating this information with the velocity of the vessel, a very accurate determination of the volume of water being passed over per unit of time can be made. The application of the chemical treatment agent such as a neutralizaton or other imbalance treatment agent or other treatment agent necessary to treat the column of water being passed over can then be effected by pumping an amount of treating agent from holding tanks on the vessel through a series of spaced orifices in a distribution or spray pattern network which extends from or about the vessel in a predetermined pattern over the body of water.

In a modification of the method of the invention, several treatment materials or a variation of one or several treatment materials may be applied to the surface of the water, either serially or simultaneously. For example, two distribution systems may be provided on the vessel, each holding a slurry with different sized particles of, for example, neutralization agent. When the vessel passes over a particularly deep portion of the lake, the relative percentage of the larger size material will be increased and pumped into the lake to fall or settle through the lake waters completely to the bottom of such lake. When, on the other hand, the vessel passes over a shallower portion, a relatively smaller proportion of larger sized slurry particles may be pumped from the vessel's tanks or the larger sized slurry particles may be completely cut off.

In a further modification of the method of the invention, the contour of the bottom in the direction of movement of the vessel may be determined by comparing the calculated volume of water passed over in consecutive periods and from this calculating the contour of the bottom. The contour of the bottom transverse to the direction of movement may be determined by comparing the volume of water passed over on consecutive passes or paths of the vessel, usually in opposite directions, across the surface of the body of water. In this manner the amount of insoluble or partially insoluble material necessary to lay an accurate and uniform layer or blanket of treatment or protective material over the bottom of the body of water can be determined and the necessary treatment material can be dispensed from the vessel to provide such uniform layer.

Alternatively and preferably, the contour of the bottom can be accurately calculated by simultaneously detecting the depth to the bottom of the lake or body of water directly under predetermined spaced apart detectors on the vessel or attached to extensions of the treatment vessel and the difference calculated directly into the relative contour of the bottom to enable a uniform layer of material to be laid down on the bottom where desired. Use of the spaced detectors can also increase the accuracy of application of material with respect to the volume of water to be treated, through determination of the bottom contour, since the relative slope of the bottom transversely to the movement of the vessel can then be determined and the amount of material supplied on both sides of the vessel can be adjusted to allow for such difference, if significant.

In a further variation of method of the invention, different materials can be dispensed to provide various combinations of volumetric treatment of the water and area treatment of the bottom of bodies of water such as lakes and the like.

While the invention is described in particular with respect to the neutralization of acid lakes and the removal of phosphorus from aquatic environments, for both of which it has been found to be particularly advantageous, it will be understood that other treatment agents besides neutralization agents could be applied by means of the invention; for example, various bases other than calcitic limestone and analogous materials, acids in case a body of water is too basic, fertilizers, algaecides, bactericides, fungicides and herbicides as well as other materials which may require very accurately controlled application to major bodies of water can be very effectively and economically applied by the invention. In general, therefore, the invention can be used to apply any chemical or biological treatment agent to a body of water to correct a predetermined environmental imbalance.

DESCRIPTION OF THE PREFERRED EMBODIMENTS

Figure 1:
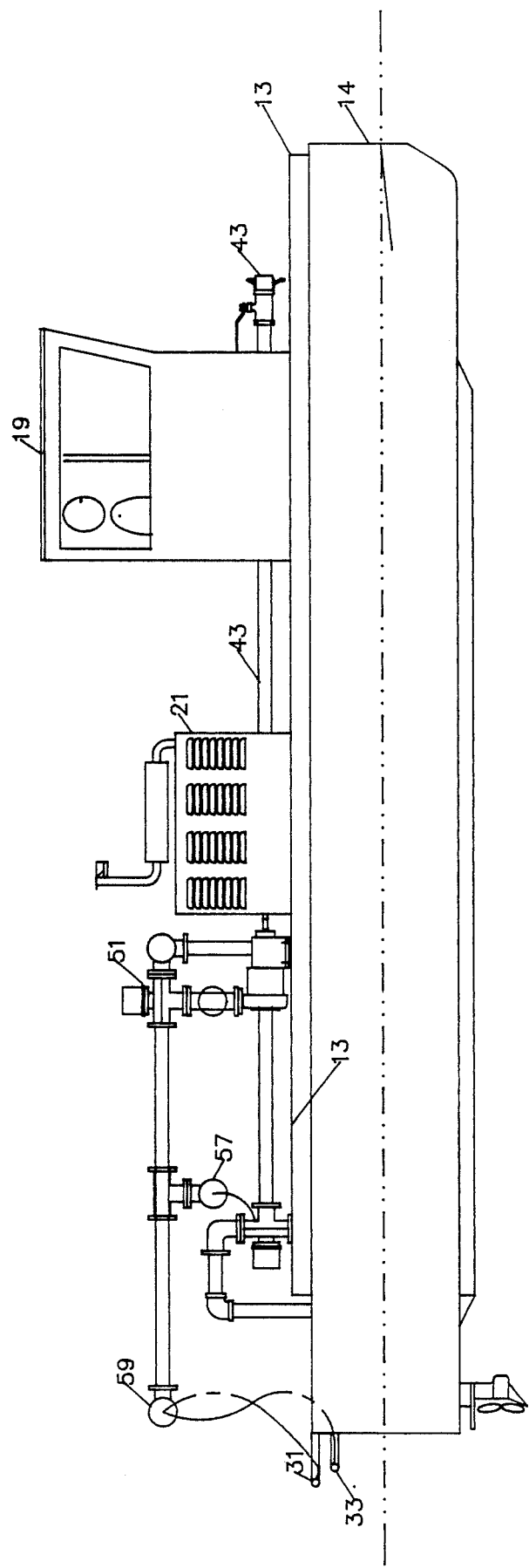
FIG. 1 is a side elevation of a vessel designed and constructed for practice of the invention.

The acidification of lakes and other bodies of water by the receipt into such bodies of so-called acid rain caused by sulfur and nitrogen oxides released to the atmosphere by combustion of fossil fuels and, in the case of nitrogen oxides, particularly by high temperature combustion processes, as well as by lightning and other natural processes, constitutes a serious current problem. Various neutralization processess have been used in the past to alleviate or mitigate such acidification of lakes and other bodies of water.

Eutrophication, or over-blooming of algae and other vegetation in lakes and other bodies of water containing excess nutrients from sewage discharges and run-off from fertilized fields, has also been an important and increasingly serious problem. Various methods of counteracting such eutrophication have been proposed including methods for limiting available phosphorus in the water. Such limitation is invariably accomplished by treating the water with a reagent such as alum or the like to precipitate the phosphorus from the water. Such precipitation must be accurately done, however, and the various treatment processes are somewhat cumbersome because the water must be carefully treated to avoid overtreatment. Such treatment processes are thus difficult and therefore expensive to implement.

The addition of various other materials to lakes and other bodies of water on a controlled basis is also frequently desirable. Such materials may include acidifying agents if the water is too alkaline, fertilizers to encourage the growth of both photosynthetic and other organic food material for fish and the like, herbicides to control undesirable plant growth, biological control vectors such as controlled plant or insect disease inducing bacterial, viral and fungal agents as well as various and sundry other materials which it may be desirable to add to various bodies of water.

Previous methods of applying all such materials have tended to be complicated and time-consuming. For example, in the neutralization of acid lakes and streams, the neutralization agents must be applied carefully and accurately in order to satisfactorily neutralize the excess acidic properties of the water, and yet not make the water basic in character which could also be detrimental.

The present inventor has discovered that the application of neutralization agents to bodies of water, as well as the application of other chemical and biological treatment agents to such bodies, can be conveniently and accurately accomplished by the use of properly designed apparatus and by a method which involves passing a vessel or other floating platform across the body of water in a pre-determined pattern designed to encompass the entire surface of such body of water, while at the same time substantially continuously measuring both the speed of the vessel, or platform, across the surface of the water, plus the depth of the water below the vessel at all times. In the neutralization of acidity in a lake, the pH of the water across which the vessel is passing is preferably, at the same time, also accurately determined. The data obtained from suitable detection devices or apparatus with regard to (a) speed of the vessel, (b) depth of the water below the vessel at any given point or time, and (c) the pH of the water through which the vessel passes is continuously integrated together in a formula to determine the amount of neutralization agent which must be applied to the body of water as the vessel or floating platform is passing across its surface. The application of the neutralization material is simultaneously varied in accordance with the volume of water, from the surface downwardly to the bottom, to which neutralization agent is being applied.

The pH of the water in the lake need not be continuously taken as the pH will always have been at least broadly predetermined beforehand, else it would not even be known that the lake water required treatment. The pH can also, of course, be manually taken at several separated points in the lake prior to treatment and an average of such pH readings can be used to calculate the neutralization required by the method of the invention. Alternatively, the pH can be predetermined in different parts of the lake and these figures then used to neutralize the lake in accordance with the invention. However, as may readily be understood, it is preferable to continuously monitor the pH of the water as the vessel passes over it in accordance with the preferred version of the invention.

When the vessel is applying other types of chemical or biological treatment agents to the water of a lake or the like body of water, the pH will, of course, not usually be continuously monitored, or, in fact in many cases, monitored at all. Nor will, in most cases, the chemical or other composition of the water be continuously monitored for other chemical or biological imbalances, although when the technology to do so on a moving or continuous basis is practically available, it may in many instances be beneficial to do so. In each case, of course, the particular chemical or biological imbalance which is to be corrected using the method of the invention will have been predetermined, usually several times and at least once, otherwise it would not even be known there was an imbalance to be corrected. If the imbalance is only approximately known, then an accurate determination, at least for the body of water as a whole, should be made prior to initiating treatment in accordance with the invention. For example, it may well be known that a lake suffers from eutrophication just by observation. However, the amount of excess nutrient material in the water and in particular, the exact phosphorus level should be predetermined for use in determining the amount of treatment agent which is to be applied to the water using the method of the invention. Of course, it is also very desirable to detect an impending deleterious chemical or biological imbalance in a body of water prior to gross manifestations of such imbalance making itself visible such as by the appearance of visible eutrophication of a lake or the like.

As explained briefly in connection with use of the invention to neutralize acid lake conditions, the vessel is passed when applying other treatment agents in accordance with the method of the invention, across the lake surface while the depth of the water is continuously or substantially continuously detected together with the speed or velocity of the vessel over the surface and this information is integrated together and used to control the dispensing of treatment agent from the tanks of the vessel into the water. One or several treatment agents may be dispensed from separate tanks in the veseel or pontoons and the treatment agent may be dispensed either into the surface of the water or under the surface, preferably by use of a planing sled or the like, when dispensing under the surface.

FIG. 1 is an elevation of a preferred design of a vessel 11 adapted for application of a chemical or other treatment agent to a body of water. The vessel 11, comprises as shown in more detail in FIGS. 2, 3 and 4, a main tank body or hull 13 to which are extendably attached two out-board pontoons 14 and 15 which serve both to provide buoyancy to the entire vessel to counteract the weight of a supply of treatment agent contained within the main tank or hull 13, and to stabilize the hull or tank 13 and the vessel as a whole to prevent capsizing. Since the vessel 11 must, as a practical matter, be fairly large in order to carry a sufficient quantity of treatment agent to continue operation without frequent resupply of such agents and at the same time must, as a practical matter, be easily carried on a trailer into remote areas where lakes to be treated, and particularly acidified lakes, are frequently located, the provision of the pontoons 14 and 15 which are extendable from the sides of the main body tank 13 is very advantageous. Such pontoons can be drawn up against the sides of the main tank hull 13 when traveling on a road or a narrow trail.

A pilot house 19 is provided on the forward section of the main tank hull 13 and a main pump enclosure 21 is located atop the deck of the main tank hull 13. A propulsion means or motor which, as shown, is preferably in the form of an outboard motor 25 (see FIG. 2) or the like, is secured to the rear of the main tank or hull 13. Two swinging spray arms 27 and 29 are pivotally mounted at the rear or stern of the vessel 13 in a position such that they may be swung out over the water as the vessel progresses across the surface of the lake or other body of water. This may be best seen in FIG. 3 where the starboard spray arm is diagrammatically shown pivoted into its extended position over the water and the port spray arm is diagrammatically shown in retracted position where it lies along the deck of the vessel 11. It will be understood that each pivoting spray arm includes a hollow tubular section 27a or 29a along the longitudinal extent of which are spaced small orifices or nozzles 28 best seen in FIG. 4 through which a liquid or slurry may pass when the hollow section of the spray arm is filled with such slurry or other treatment agent.

Figure 2:
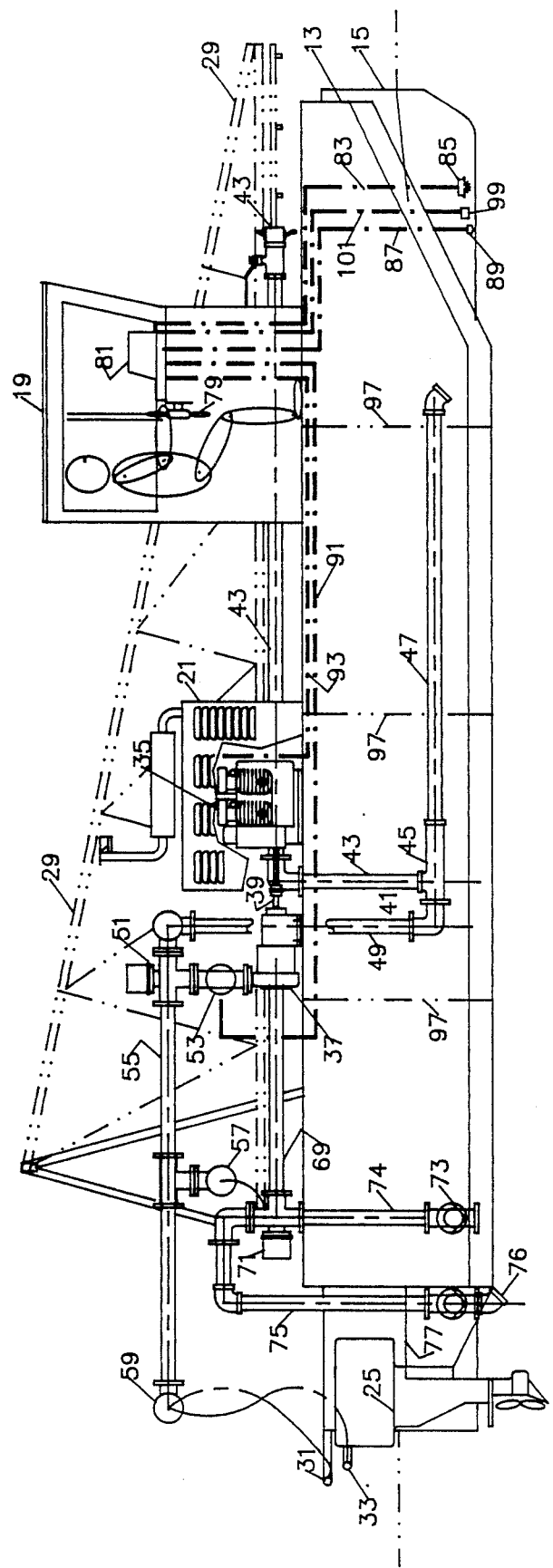
FIG. 2 is an elevation of the starboard or right side of the vessel shown in FIG. 1 partially broken away to show the internal mechanisms.
Figure 3:
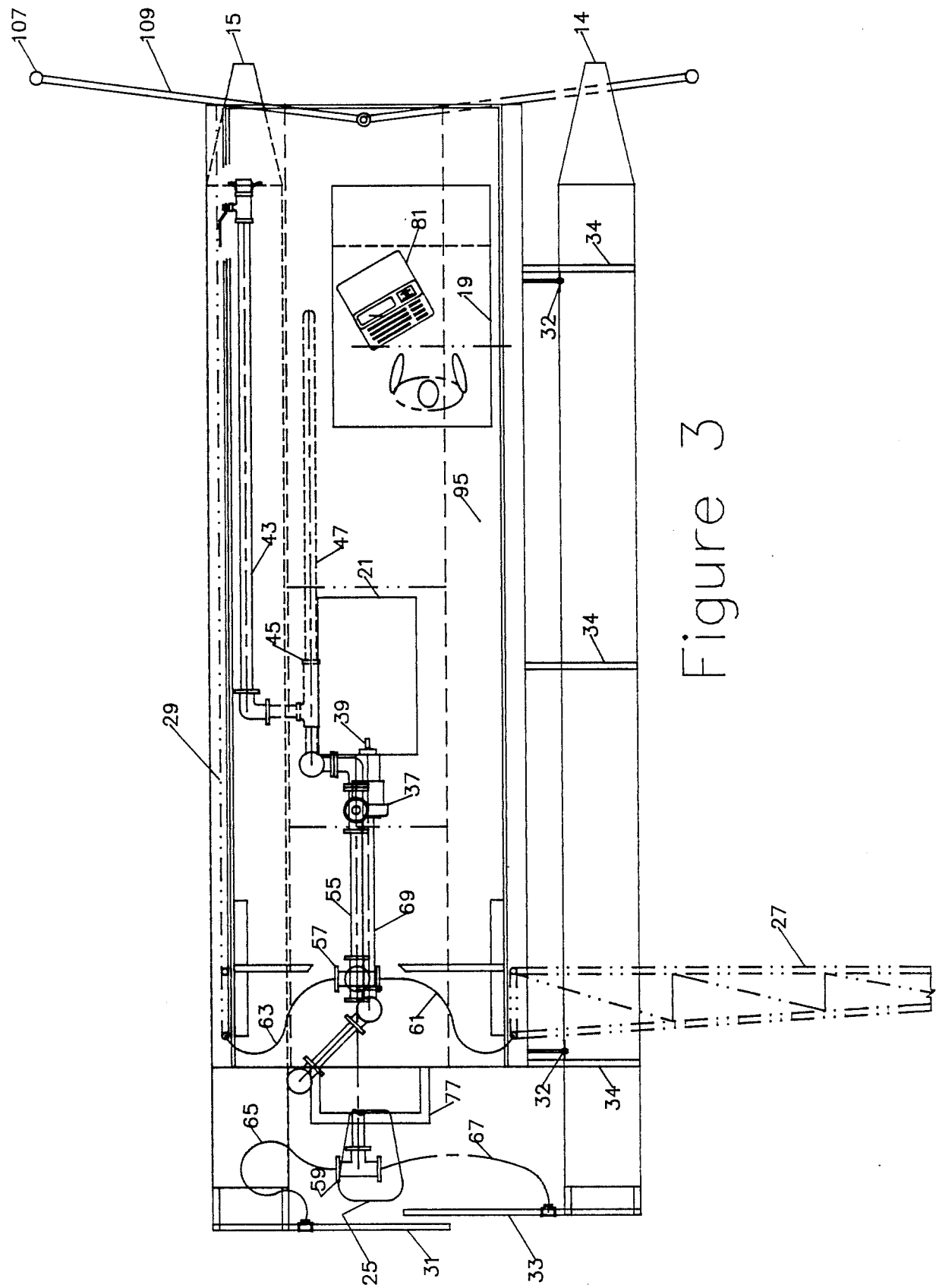
FIG. 3 is a broken away top or deck plan view of the vessel shown in FIGS. 1 and 2.

At the rear or stern of the vessel are located two spray bars 31 and 33 which are also hollow and provided with spaced orifices 30 in a manner similar to the spray arms 27 and 29. The spray bars 31 and 33 are preferably secured to the pontoons 14 and 15 in an overlapping pattern, as best seen in FIG. 3, and serve to provide spray material in the central location between the spray arms 27 and 29 so that a uniform application of the treatment agent may be made to the surface of a lake or other body of water as the vessel 11 passes forwardly across its surface. As best seen in FIG. 2, the pump enclosure 21 contains a pump motor 35 which operates a pump 37 through a shaft connection 39. The pump 37 is connected into or is an integral part of a pumping and sparging pipe assembly indicated generally as 41. The pumping and sparging pipe assembly 41 includes a bulk material fill pipe 43 which is connected to the upper portion of a venturi eductor 45. The forward or discharge portion of the eductor 45 is connected to a mixing tube 47 which opens into the forward portion of the tank hull 13. The eductor 45 is also connected at the rear or inlet to the pump 37 through connecting pipe 49 which passes through a motor operated three-way valve 51 connected to the pump 37 through a flow meter 53. A third arm of the three-way valve 51 is connected to a feed pipe 55 which extends to the rear or stern of the vessel and is provided with hose connections 57 and 59. Hose connection 57 serves to connect suitable hoses 61 and 63 to the feed pipe 55. The hoses 61 and 63 lead respectively to the spray arms 27 and 29 or more particularly the spray pipes 27a and 29a. Hose connection 59 serves to connect the feed pipe 55 through the hoses 65 and 67 respectively to the spray bars 31 and 33.

The intake side of the pump 37 is connected to an intake line 69 which is connected at the other end to a motor operated three-way valve 71. One arm of the three-way valve 71 is connected via a tank suction line 74 to a foot valve 73 within the interior of the main tank or hull of the vessel 11. The other arm of the three way valve 71 is connected with a lake suction line 75 which terminates outside the main tank or hull 13 of the vessel 11 in an intake 76 below the normal waterline of the hull 13.

As shown in the drawings, the outboard motor 25 may be attached to the main tank or hull 13 via motor bracket 77. In the pilot house or wheel house 19 there is provided the usual wheel 79 for navigation or steering of the vessel. Also preferably located in the wheel house or pilot house is a control computer 81 which may be a standard microcomputer suitably programmed for operation in accordance with the invention. The control computer 81 is connected via suitable leads with various external detection devices or elements for detecting the speed of the boat or vessel, the depth of the water under the vessel, and preferably also the pH or other chemical balance of the water surrounding the vessel. The control computer will also preferably be connected with the operating portions of the system such as the flow meter detector 53 and the pump motor 35. The computer may also, but need not, be connected to the various motor operated three-way valves 51 and 71 which control the path of the material through the pumping system. In this regard, detection lead 83 connects the control computer 81 to a hull speed transducer 85 located on the lower outer surface of the pontoon 15. Detection lead 87 connects the control computer 81 to ultrasonic depth transducer 89 which is also located on the lower surface of the pontoon hull 15 in a position such that ultrasonic waves may be directed toward the bottom of the lake and upon reflection therefrom detected and the time interval for return noted in order to calculate the depth of the water. Likewise, detection lead 91 extends from the control computer 81 to the flow meter 53 which detects the flow of slurry through the outlet from the pump 37. The further control lead 93 connects the pump engine 35 with the control computer 81 in order to regulate the speed of such engine and therefore the slurry volume passed through the pump 37.

The control computer 81, as noted, may be a microcomputer but may also be any other type of digital or analog computer which can receive the required data and process it. Such computer must, of course, incorporate or have available an accurate clock function or other timing device in order to accurately determine the water depth from the sonic or other reflected wave data. Upon receipt, the various data is preferably stored at least initially in the microcomputer memory for use in contemporaneous calculations, but can also be entered upon magnetic tape or disks for future study and analysis. The microcomputer 81 or other computer provides an essential element of the control system. Although a number of commercially available devices may be employed as the control computer 81, a relatively low power device such as model PC of the IBM Company has been found to be very satisfactory. The microcomputer controls the pump motor or other metering means for control of the dispensing of the neutralization agent in accordance with the calculations effected by the processing section of the microcomputer based upon the meter data received from the sonic pressure meter (for water depth) and the speed data received from the hull speed transducer, which may take the form of a partially shielded paddle wheel arrangement which rotates at a rate proportional to the speed of the vessel through the water. The same type of meter device is frequently used for accurate measurement of the movement of a sailing yacht through the water. As indicated previously, the microcomputer may also receive electronic signals from other detection apparatus such as a pH meter electrode and provide control signals to other dispensing related mechanisms such as the various solenoid valves in the system and the like.

The vessel 11 is usually transportable on a trailer or the like to the point of use. In order to facilitate such transportation, the pontoons 14 and 15 are, as indicated briefly above, retractable into a position nested closely against the main tank or hull 13. This is shown more particularly in FIGS. 3 and 4 where it may be seen that the pontoon 14 is in extended position and the pontoon 15 is in the retracted position. The pontoons 14 and 15 are preferably extendable from a retracted position to an extended position and back again through the action of a hydraulic cylinder means 32 which serves to move the pontoons inwardly and outwardly upon supporting slide bars 34 which may be provided with a suitable track mechanism or means, not shown. Other suitable supporting and retracting means may be used to support and move the pontoons with respect to the remainder of the vessel. Such other mechanisms may comprise telescoping supports, mechanically folding supports and the like.

Figure 4:
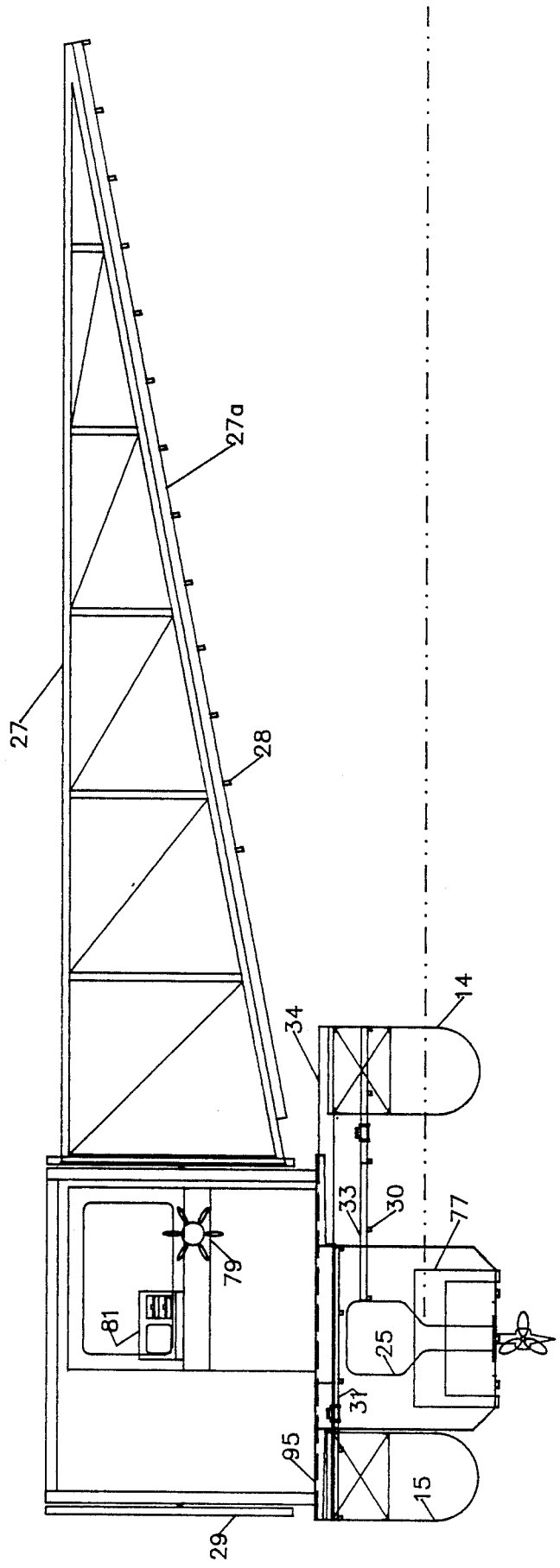
FIG. 4 is a rear or stern elevation of the vessel shown in the previous Figures.

It will be seen in FIGS. 3 and 4 also that the vessel has an extended deck 95 which projects beyond the sides of the main tank or hull 13 and in effect covers the position in which the pontoons 14 and 15 retract when the vessel is not in the water. It will also be noted that the pontoons 14 and 15 are somewhat longer than either the main tank or hull 13 or the deck 95 positioned on top of the tank 13 and extending to the sides over the position of the retracted or nested pontoons. It will also be noted in FIGS. 2 and 3 that the main tank or hull preferably has three bulkheads or tank partitions 97 which divide the main tank essentially into four separate portions or compartments. In the embodiment of the invention illustrated in FIGS. 2, 3 and 4, these bulkheads 97 have openings in them to allow the slurry material free passage from one compartment to another under normal conditions, but small enough to prevent surging or sloshing of the slurry from section to section under outside influence. As will be seen presently, the bulkheads could be imperforate if it is desired to store different materials in the various compartments and to dispense such materials directly from the individual compartments.

In operation, the vessel 11 is transported by trailer or the like to the lake or other body of water where it is to apply a neutralization agent or other chemical treatment agent to the lake. Normally the vessel 11 will be transported overland without any load of neutralization agent in the main tank or hull 13 in order to reduce the weight. After the vessel 11 is launched into the lake or other body of water by running the trailer into the lake until submerged and the vessel floats therefrom or is otherwise launched and the pontoons 14 and 15 extended, the vessel is brought near the shore, preferably with its bow against a dock with sufficient water depth to allow for the change in hull displacement as the material is loaded, and a bulk material hose from a tank truck or the like is connected to the bulk material fill pipe 43. In the case of dry bulk material, the pump engine 35 is then started and the three-way valve 71 operated so that the lake suction line 75 is connected with the pump intake line 69 and operation of the motor 35 draws water through the lake suction line 75 into the valve 71 and thence into the intake line 69. Water passes through the pump 37 and out through the flow meter 53 into the three-way valve 51 which is operated in such manner that the fluid then passes down the connection pipe 49 into the venturi eductor 45, through the venturi eductor and out the mixing tube 47 into the forward portion of the main tank or hull 13.

As the water passes through the venturi eductor 45 it creates a suction in the bulk material fill pipe 43 so that material in such fill pipe is drawn into the venturi eductor and expelled through the mixing tube 47. This arrangement of valves is continued until the main tank hull 13 is substantially filled with lake water or filled to whatever level is desired. At this point the three-way valve 71 is operated so that the lake suction line 75 is closed and the foot valve 73 to the tank suction line 74 is opened so that lake water is now drawn from the interior of the main tank or hull 13 near the stern and passed through the three-way valve 71 to the intake line 69 into the intake side of the pump 37 and then through the flow meter 53 and the three-way valve 51 down through the connection pipe 49 and out the venturi eductor 45 and the mixing tube 47 into the forward portion of the hull as before. As the water continues to flow through the venturi eductor 45 additional bulk material is drawn through the bulk material fill pipe 43 into the system. This mode of operation is continued until the proper amount of bulk material in the tank truck or the like has been completely drawn into the main tank or hull 13. Emptying of the bulk material from the truck may be aided by a separate pressure or other pumping system in the tank truck. When all the material which is desired to be included in the slurry charge has been drawn into the hull 13 the bulk material fill pipe 43 will be closed off and the pump system will continue to operate in the same mode so that the material in the tanks is continuously mixed or sparged. This may be referred to as the sparging mode of operation. The vessel is at this point ready to operate to spread the neutralization material into the lake.

The vessel 11 may after charging be navigated into the lake by conventional operation of the outboard motor 25 and piloting of the wheel 79 until the vessel is traveling in a straight course from one side of the lake to the other. At this point three-way valve 51 may be operated or adjusted to direct the slurry being suctioned or drawn in at the foot valve 73 from the interior of the main tank or hull and directed through the feed pipe 55 to the hose connections 57 and 59 from whence it passes through the respective hoses 61 and 63 and 65 and 67 and thence to the spray arms 27 and 29 and the spray bars 31 and 33. The slurry material then passes from the spray arms 27 and 29, and spray bars 31 and 33 (in the case of the spray arms, through the spray pipes 27a and 29a) and out through the spray orifices or nozzles 28 and 30 which are spaced evenly upon the spray bars and spray arms respectively so that an even pattern of spray of the essentially liquid slurry material is sprayed upon the surface of the lake. When the vessel reaches the far shore of the lake it is turned and proceeds back along a parallel path in the same mode of operation continuing to spray material onto the surface of the lake through the nozzles 28 and 30. The parallel pass of the vessel will, of course, be directed or navigated so there is a minimum of overlap of the spray being passed into the water while maintaining a contiguous pattern of spray with no untreated intermediate areas. At the same time the control computer receives data from the hull speed transducer which can be converted into speed, preferably in feet per minute and the ultrasonic depth transducer, as known to those versed in the art, projects ultrasonic pulses toward the bottom of the lake and detects the return of such pulses from the bottom after being reflected therefrom. The time lapse between the output pulse and the detection of the reflected signal is monitored and used by the computer 81 or an appropriate separate computer apparatus to determine the distance which the ultrasonic pulse has traveled and therefore the distance of the bottom of the lake from the ultrasonic depth transducer 85 positioned at the bottom of the pontoon 15.

There is preferably also a pH indicator device 99 disposed on the pontoon 15 and also preferably upon the pontoon 14 in a position such that it is exposed to the lake water as the vessel passes by. The pH electrode 99 is connected to the control computer 81 through the lead 101. As noted, there is also preferably a similar pH electrode mounted on the opposite pontoon 14 in the same position. This pH electrode 103 is connected to the control computer by the lead 105. Alternatively, a pH electrode 107 may be positioned on the end of a short boom 109 which is in turn pivotally mounted on the foreward portion of the deck 95 on the main tank or pontoon 13 in a position such that the boom 109 may be pivoted from side to side so that the electrode 107 may be dipped into the surface of the water on the far side of the vessel 11 from which the vessel passed during a previous neutralizing agent discharge. In this manner the pH electrode 107 will not be affected by the neutralization agent which has already been applied to the surface of the lake on the opposite side of the path of the vessel 11. If the back and forth passes of the vessel are short and closely spaced in time, the boom 109 is unlikely to be necessary, particularly if the spray arms of the vessel are fairly long, for example, twenty feet or more. However, if the passes of the vessel are not closely spaced in time or the surface waters are turbulent, the boom 109 may add to the accuracy of the pH readings. The pH electrodes positioned on the two pontoons may likewise be used alternately depending upon the direction of the previous neutralization track. The two pontoon mounted pH electrodes may also be activated simultaneously in which case any variation between the two is useful to indicate possible deviations caused by neutralization agent already applied to the water.

Of course, if the vessel is being used to dispense some treatment other than a neutralization agent into a lake or other body of water the pH electrodes will not normally be used or even be present, but will be replaced in some cases by other appropriate detection apparatus. In other cases, no detection apparatus at all will be used, since, as noted previously, at least the general condition of the body of water will be known or predetermined previous to beginning dispensing operations.

FIG. 5 is a broken away view of an improved embodiment of the invention in which a piping arrangement is provided which allows material to be drawn from two separate tanks within the vessel 11 so that different treatment agents may be sprayed from the spray arms 27 and 29 and spray bars 31 and 33. Alternatively, the different treatment agents may be drawn from tanks provided in the pontoons 14 and/or 15, which tanks are not shown. The vessel shown in FIG. 5 is essentially similar to the vessel shown in FIG. 2 and the same reference numerals are used to identify corresponding parts. In addition to the parts shown in FIG. 2, however, there are two additional motor operated three-way valves 111 and 113. Three-way valve 111 is inserted in the piping between the three-way valve 71 and the foot valve 73. One arm of three-way valve 111 is connected to a transverse feed line 115 which connects with an additional tank suction foot valve 73*a* through piping 47*a*. The original foot valve 73 is arranged to draw slurried calcitic limestone, alum or other treatment material from the rear tank or rear compartment 125 of the main tank or hull 13. The second three-way valve 113 is placed in the mixing tube 47. One arm of three-way valve 113 diverts material being mixed or sparged through eductor 45 into the rear compartments of tank 125 in hull 13. The other arm of the three-way valve 113 directs material being mixed or sparged to the foreward tanks 126 of hull 13. The center bulkhead 97 in FIG. 5 is imperforate. The three-way valves 111 and 113 are preferably positioned as near the top of the tank sections as possible so as to interfere as little as possible with the contents of the tanks particularly when the tanks are relatively full of slurry material.

In operation, the apparatus shown in FIG. 5 may when the computer control detects water over a certain pre-determined depth, not only increase the flow rate of the slurry as measured by the flow meter 53 by increasing the speed of the pump engine 35, but may also switch to a separate tank of slurry material which has or incorporates larger sizes of, for example, calcitic lime particles when neutralization is to be effected, so that such particles as they settle through the water will not become completely dissolved until they settle onto the bottom of the lake. As will be understood, the amount of slurry is adjusted so that the particles will be substantially completely dissolved just as they reach the bottom so that excess neutralization agent does not become embedded in the bottom or lie in a blanket upon the bottom, which might cause deleterious effects through excess basicity of the bottom water, not to mention being a serous waste of neutralization material and operating time, since the tanks, once emptied, must be refilled. Since the larger sized neutralization agent particles will normally be used only in deeper water and it is desirable that they should enter the flow system as quickly as possible when suitable valves are operated it is desirable that the rear tank 125 of the main tank or hull 13 be the tank or compartment which contains the larger size slurry particles. There is then a relatively shorter feed line which must be filled with the slurry material before slurry begins to be expelled from the vessel into the water.

Figure 5:
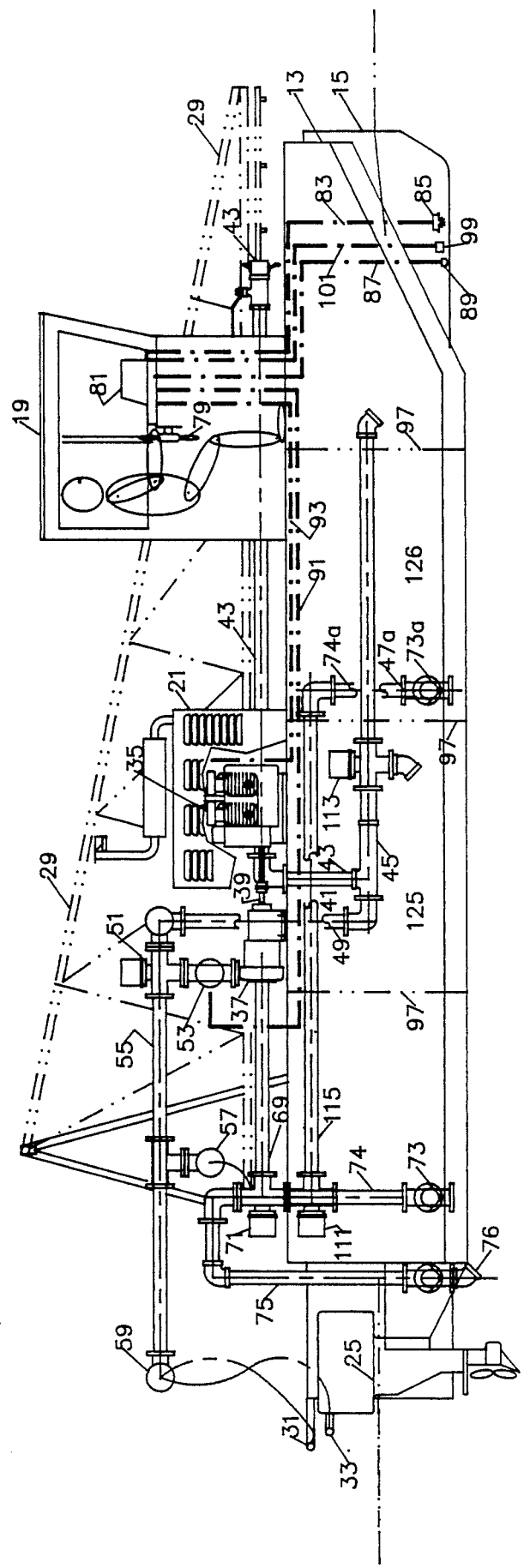
FIG. 5 is a broken away side elevation of an alternative embodiment of a vessel for practice of the invention.
Figure 6:
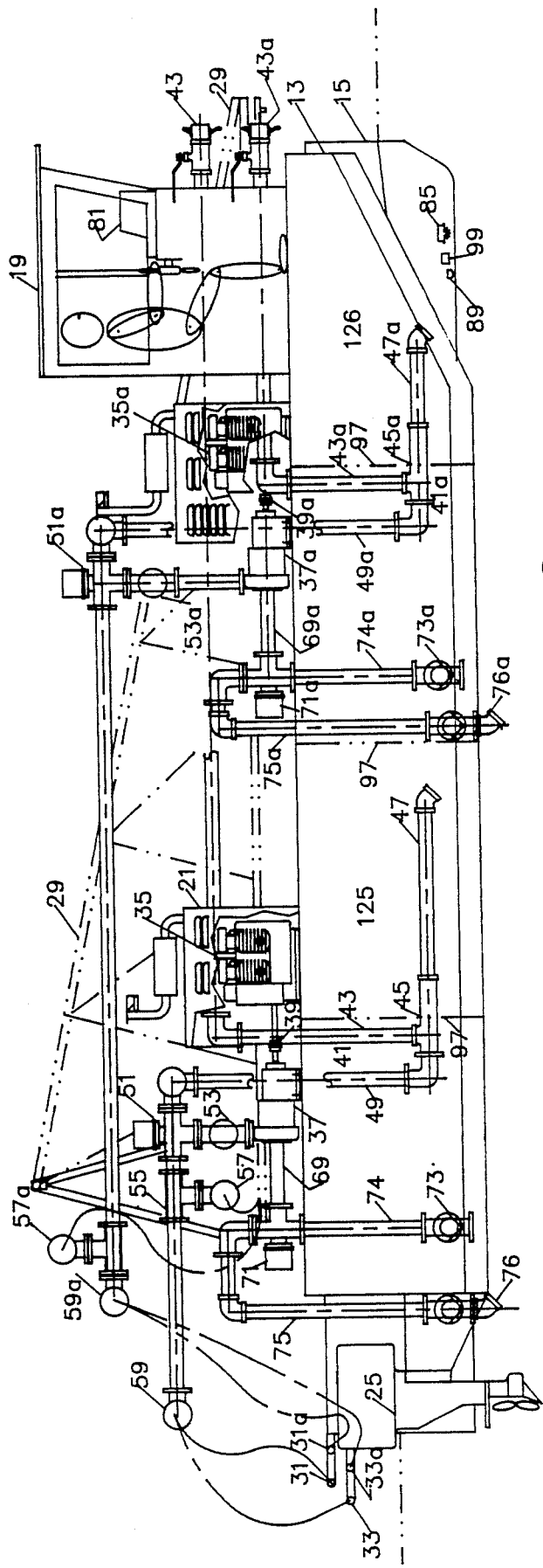
FIG. 6 is a broken away side elevation of an improved embodiment of the invention incorporating two pumping and sparging systems.
Figure 7:
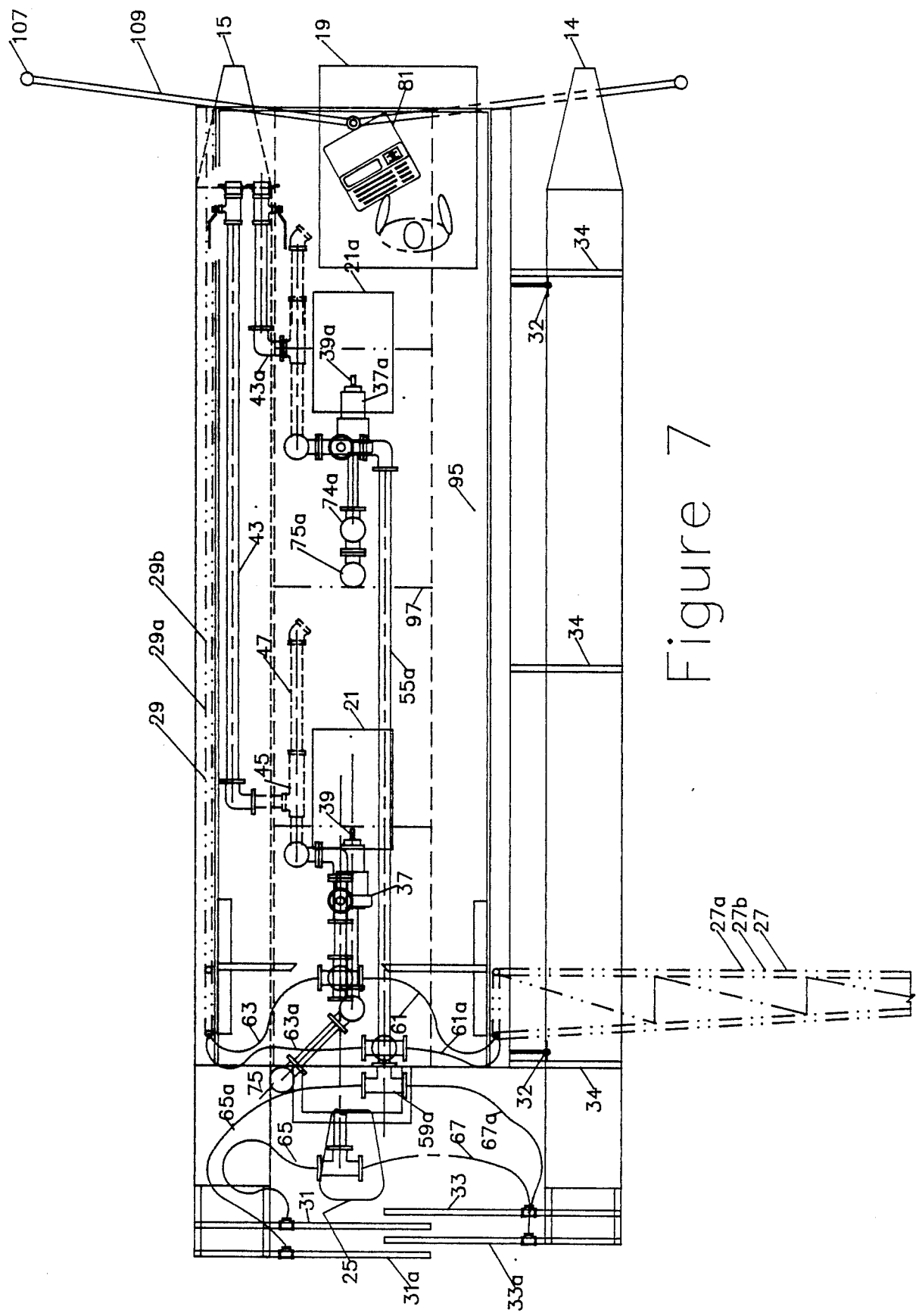
FIG. 7 is a broken away deck plan view of the improved embodiment of the invention shown in FIG. 6.

FIGS. 6 and 7 illustrate a still further improvement of the basic vessel shown in FIG. 2. FIG. 6 shows an elevation of the vessel similar to the elevations in FIGS. 2 and 5, while FIG. 7 is a plan view of the vessel. The essential difference between the embodiment shown in FIG. 5 and the embodiment shown in FIGS. 6 and 7 is the substantial duplication in the embodiment of the latter figures of the pumping and sparging pipe assembly shown in FIG. 2. For convenience, therefor, the duplicate apparatus as shown in FIGS. 6 and 7 are designatd by the same reference numerals as used in FIG. 5, but with a letter designation "a" used after each such reference numeral. Thus, there is a duplication of the pump 37 and shaft drive 39 to the pump designated respectively as pump 37a and shaft 39a, which pump and shaft are positioned to be driven by a separate pump motor 35a. The outlet from the pump 37a passes through a separate flow meter 53a to a motor operated three-way valve 51a which is connected to a separate feed pipe 55a which as best shown in FIG. 7, leads astern to a hose connection 59a which is connected by suitable hoses 63a and 65a to separate spray pipes 27b and 29b supported upon the spray arms 27 and 29. As best shown in FIG. 6, the tank suction line 74 and foot valve 73 are duplicated by tank suction line 74a and foot valve 73a positioned in FIG. 6 in the center of the vessel 11. A duplicate mixing tube 47a leads from the motor operated three-way valve 51a to the bottom of forward tank 126 as in FIG. 6. The venturi eductor 45a is provided along with a bulk material fill pipe 43a which may be used to feed a slurry of neutralization agent having larger sized slurry particles than are fed on board through the opposite fill feed pipe 43.

Since in the improved embodiment shown in FIGS. 6 and 7, slurry can be equally well drawn from either of the separate tanks 125 or 126 in the main tank hull 13, it does not matter to any great degree in which tank the larger size slurry particle material is contained. In other words, each pumping system on board will be used to handle separately a separate treatment agent which can not only be agents having a different particle size, but can be agents having a completely different chemical composition. The various three-way valves 71 and 71a, will be suitably operated at appropriate times to draw the necessary materials from the appropriate vessel tank. Likewise, the motor operated three-way valves 51 and 51a will be appropriately operated to direct neutralization slurry material to the hose connections 57 and 59 and 57a and 59a at appropriate times depending upon the depth of the water detected by the control computer 81 based upon signals from the ultrasonic depth transducer 89.

The apparatus shown in FIGS. 6 and 7 is particularly desirable where alternate deep water portions and shallow water portions as well as intermediate depths of water are encountered in the same large body of water, since the two application or neutralization systems can be operated completely independently. In other words, either one of the pumping systems 41 or 41a can be operated in the spray mode with the other system in the sparging mode or in intermediate depths of water the two pumping and sparging systems can be operated in the pumping mode at the same time through the separate spray pipes 27a and 27b on the spray arms 27 and 29, with the amount of slurry material expelled to either of the spray arms being regulated in relation to each other so the exactly desired neutralization or other chemical treatment of the water can be attained. It is also possible to operate both systems in deep waters where the heavier material or particles will fall directly to the lower portions of the water while the shallower portions will be neutralized mainly by the smaller sized particles which will completely dissolve before they reach the lower or bottom portion of the lake.

The same systems can be very easily used for the accurate liming of lakes where a thermocline, i.e. a sharp temperature change or inversion, exists at any given depth in the water. For example, in a lake where a thermocline exists at a 30 foot depth, it may be desirable to apply a product made up of 40 mesh by 0 particles to the areas below 30 feet deep and 325 mesh by 0 particles to all waters less than 30 feet deep. When using the prior zone method of application varying quantities of the 325 mesh and the 40 mesh slurries will be applied to the various zones, according to the average depths. However, unfortunately, some of the areas under the thermocline will go untreated as no 40 mesh slurries are applied to the shallower zones even though they would probably contain some deep water. By the use of the apparatus of the invention shown particularly in FIGS. 6 and 7 where two tanks and pumps are used, one tank and pump can handle the 325 mesh slurry and the second tank and pump can handle the 40 mesh slurry. The process controller and the control computer would be set to apply a uniformly increasing amount of slurry up to 30 feet in depth. Beyond that depth the 325 mesh slurry application would remain constant and the process controller or control computer would begin the application with 40 mesh slurry which would be adjusted according to the depth to apply a uniformly increasing amount of slurry only when the water is more than 30 feet deep. The same procedure may be followed when a thermocline is involved. Thus, the thermocline would be penetrated by the larger, heavier neutralizer particles and the water beneath it would be properly treated with the heavier material.

When using the duplicate pumping system shown in FIGS. 6 and 7 simultanouely with varying or changing amounts of slurry material being discharged it is necessary to provide a means for separately varying the discharge or pumping rate. With only one pump as shown in FIG. 2 the pumping rate can be easily adjusted by varying the speed of the pump motor 35. With two separate pumping systems two separate motors can be used as shown in FIGS. 6 and 7. Alternatively, two separate transmissions driven by a single motor can be used to vary the pumping rates of the two pumping systems. A still further alternative would be to use a variable opening valve on the discharge side of the pumps to restrict the flow when necesary. While effective, such use of a restrictive valve may place a serious strain on the pump leading to premature failure and possible settling out of the slurry particles with resultant blockage or stoppage of the pumping system.

The same dual agent treatment can be accomplished with the embodiment of the invention shown in FIGS. 2 to 4 rather than the embodiment of FIGS. 6 and 7 by first making a single traverse of the lake with the smaller mesh size slurry and then retraversing the lake with a larger mesh size slurry. In such case very accurate distribution of the smaller size slurry is made based on the depth of the water to a certain predetermined depth and upon the second traverse or series of passes across the lake the deeper portions are additionally treated. Some adjustment in the amount of slurry discharged on the first pass would in such case be made to allow for partial dissolution of the subsequently applied lime particles from the second pass while settling through the water above the thermocline. Of course, it is more convenient and also likely to be more accurate to use the improved embodiment shown in FIGS. 6 and 7 which requires only a single traverse of the lake. It will be understood that it may also be necessary to use two control computers when the two systems are used. However, most control computers are adequate to keep track of two application traverses at one time. An adequate software program may easily be provided by those skilled in the art to run both pumping apparatus from the same computer simultaneously.

Calculation of the amount of slurry to be applied can be done as follows:

Calculation (Water Depth) × (Application Width) × (Velocity of Vessel) =

Cubic Units of Water being passed over by Vessel per Unit of time.

Example

| | |
|---|---|
| Water Depth | = 40 feet |
| Application Width | = 60 feet |
| Velocity of Vessel | = 880 feet/minute |

The current volume of water being passed over

= (40 feet) × (60 feet) × (880 feet/minute)
= 2,112,000 cubic feet per minute.

The above information can then be used to determine the rate of chemical application that is necessary to treat the column of water being passed over each minute based upon the desired application rate of the neutralization agent as follows:

Calculation (Desired Material Application per Unit Volume of Water) ×

(Volume of Water being passed over by Vessel per Unit Time) =

Application Rate of Material per Unit of Time

Example

Desired Material Application per Cubic Foot of Water is 0.000081 gallons/cu. ft.

The vessel is passing over water at the rate of 2,112,000 cu. ft./minute.

The Application Rate of Material at that rate

= .000081 gallons/cu. ft. × 2,112,000 cu. ft./minute
= 171.1 gallons of slurry to be pumped from the vessel through the orifices per minute.

The above information can be used to control the material pumping rate or other suitable application procedure so that materials are being applied at the proper rate at any given time during the vessel's distribution path across the surface of the body of water.

As indicated above, the technique of the invention can also be used to apply more than one treatment material at a time. The same calculations would be used for each material. For example, in liming acid lakes in hot weather, sometimes two grades of limestone slurry are desirably applied, the coarser grade being to penetrate a thermocline which forms during warm weather. Otherwise small particles of calcitic limestone will tend to be retained upon the surface of the thermocline forming a high concentration of limestone and very basic conditions at an intermediate depth in the lake, but allowing no neutralization to speak of at lower depths. The use of larger particles of limestone in the slurry, however, allows the particles to penetrate the thermocline and continue sinking toward the bottom as they dissolve.

As indicated briefly hereinabove one of the many treatment agents which can be applied to lakes and other bodies of water in accordance with the present invention is alum or trivalent aluminum sulfate applied to precipitate and/or control redissolution of phosphorus in the water to control eutrophication due to excess nutrients in the water. The trivalent aluminum sulfate, sometimes referred to as "papermaker's alum", since it is not technically a real alum, which is a double sulfate salt, reacts under proper pH conditions both with dissolved phosphorus in the water to form insoluble aluminum phosphate and with the water forming a flocculent or colloidal precipitate of aluminum hydroxide which absorbs inorganic and entraps particulate phosphorus in the water which then settles with the floc to the bottom. Trivalent aluminum sulfate is widely used not only to precipitate phosphorus, but as a settling agent in general to clarify water by bringing down or settling fine colloidal materials of many kinds. The aluminum hydroxide formed with an excess of water upon the application of alum material within certain pH ranges is a flocculent or gelatinous substance which readily becomes engaged with other solids in the water and precipitates them along with itself.

In the use of alum to remove or precipitate phosphorus from water, the alum is desirably added to the water as a concentrated solution or slurry below the surface of the water together with sodium aluminate to maintain the correct pH range. If added at or through the surface the two compounds may not mix efficiently upon release so that the reaction is not conducted at the correct pH. Additionally, floc which forms may react very quickly with the excess water forming a gelatinous floc which may not only become engaged with air bubbles which may prevent it from settling, but may become temporarily adhered to the underside of the water surface resulting in an undesirable gelatinous mass floating at the surface. In addition, since the floc is very light, it can easily become impeded in its descent to the bottom by thermoclines in the water interferring with its orderly precipitation to the bottom. It has been found therefore, that it is preferable to dispense the alum to the water spaced not only from the bottom, but also from the top. Also, the addition of alum or aluminum sulfate by itself will frequently lower the pH into the acid range engendering difficulties much like the difficulty had with lakes exposed to acid rain. This is particularly true when a lake is not already well buffered by alkaline materials. A pH of 6 or less will tend to dissolve heavy metals such as copper and cadmium and will also solubilize aluminum which in itself is toxic to fish. The most toxic pH is approximately at a pH of 5.0. It is desirable, therefore, to immediately surround or mix the aluminum sulfate with a buffering or neutralizing agent dispensed at the same time. This is accomplished by dispensing sodium aluminate or some other alkaline material at the same time as the aluminum sulfate. Removal of particulate phosphorus is most efficient within a pH range of about 6 to 8.

Figure 8:
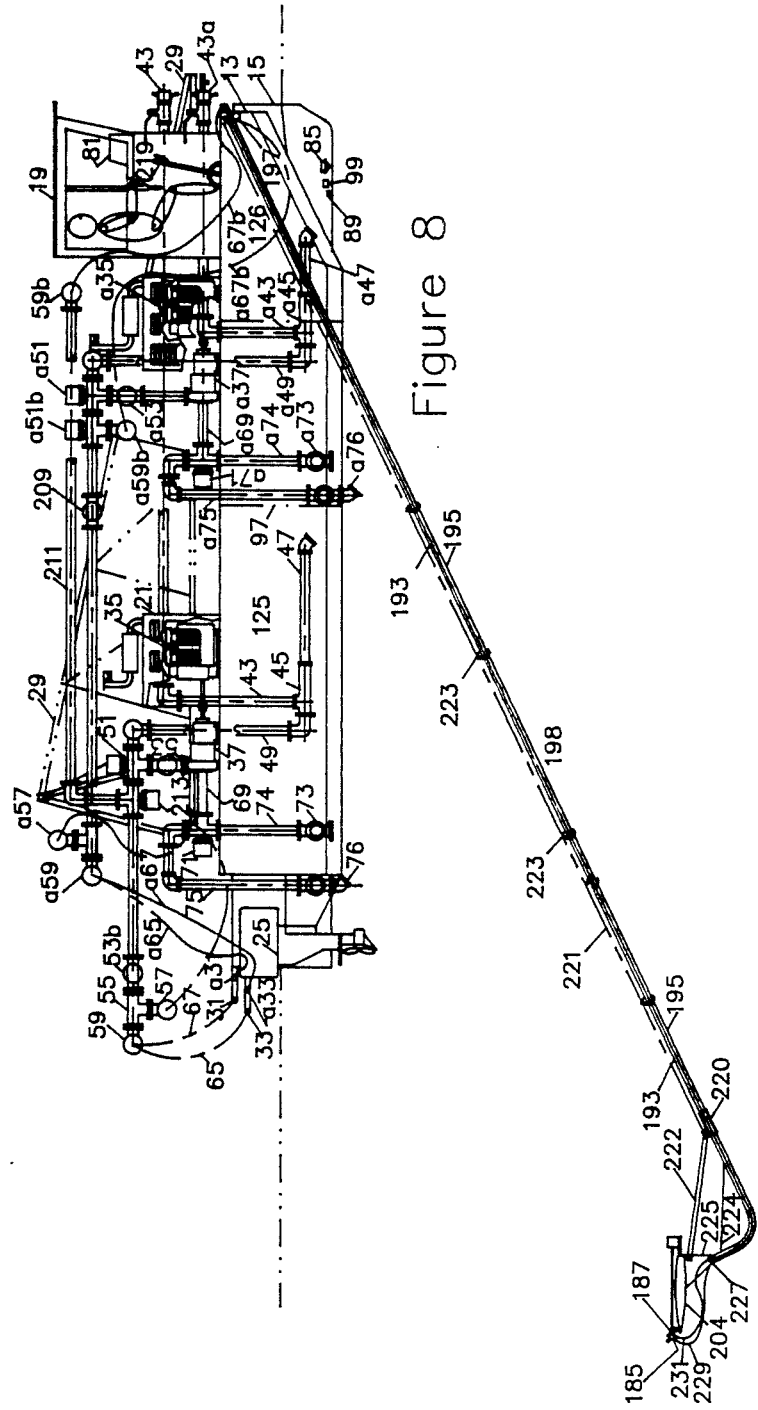
FIG. 8 is a broken away side elevation of a further embodiment of a vessel arrangement for practice of the invention.
Figure 9:
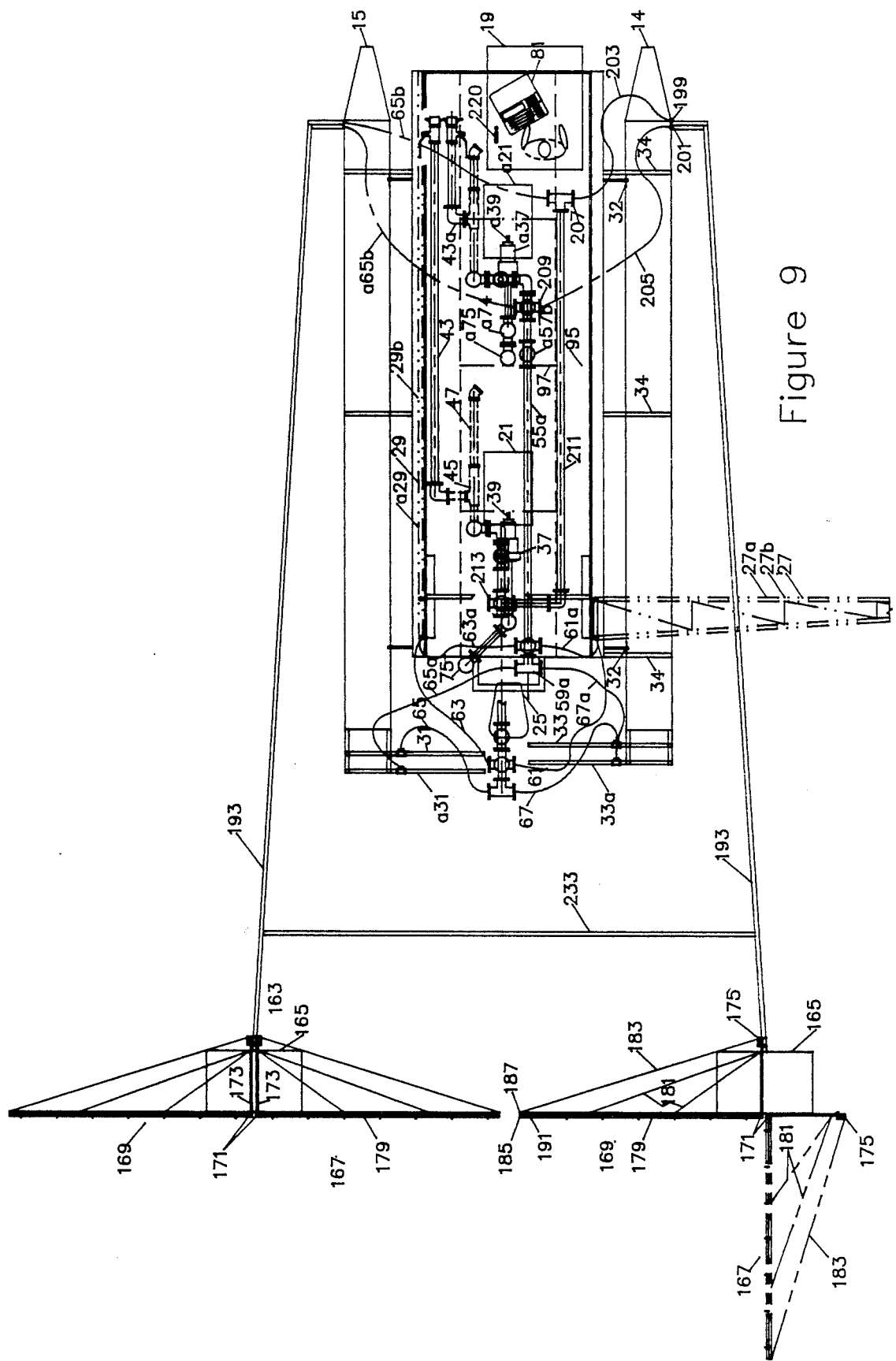
FIG. 9 is a broken away top or deck plan view of the vessel shown in FIG. 9.

FIGS. 8 and 9 show a further embodiment of the invention in which the vessel used for dispsensing treatment agent is substantially as shown in FIGS. 6 and 7, but is equipped in addition with dual planing boards or sleds for dispensing alum and preferably also a neutralizing agent such as, for example, sodium aluminate. It will also be noted that in FIG. 9 both pontoons 14 and 15 are shown extended. In FIGS. 8 and 9, the same reference numerals are used to identify the same or similar structures on and in the dispensing vessel as are used in FIGS. 6 and 7. A pair of planing board or planing sled assemblies 161 and 163 are shown, particularly in FIG. 9 which is a top or plan view of the arrangement. Each planing board assembly is comprised of a planing board 165 which preferably has a positive buoyancy. Two spray bar assemblies 167 and 169 are mounted upon the planing board. Each spray bar assembly is preferably pivoted to the planing board by a hinge means 171. A latch bar 173 is fixedly secured to the spray bar assembly 167 or 169 at one end and has a mechanical trip latch 175 adapted for engagement with a latch engagement fitting 177. The mechanical trip latch may be any suitable latch which will open or uncouple upon being subjected through a trip wire or the like to a predetermined force, allowing the attached spray bar assembly 167 or 169 to swing backward to relieve snagging upon an underwater obstruction rather than breaking.

One of the spray bar assemblies 167 is shown pivoted on its hinge 171 in FIG. 9. The principal portion of each spray bar assembly 167 or 169 is a one or two piece spray bar 179 fixedly attached to the latch bar 173 at one end and also guyed from it by cable bracing 181, preferably in the vicinity of the latch 175. An outer trip wire 183 extends from the latch 177 to the extremity of the spray 179. If the trip wire 183 contacts or snags an underwater obstruction which cannot be brushed aside, the trip wire will transmit sufficient tension to the latch mechanism of the latch 175 to open such latch allowing the latch bar 173 to swing away from the latch and the attached spray bar 179 to pivot on its hinges 171 to avoid damage to such spray bar. The spray bar 179 itself is preferably comprised of two substantially rigid hollow spray pipes or tubes 185 and 187 welded or otherwise secured together into the more or less unitary spray bar 179. Each spray pipe 185 and 187 is provided with a series of spaced dispensing orifice nozzles 189 and 191 through which a solution or slurry may be dispensed to the surrounding water. The orifice nozzles 189 and 191 are preferably disposed close together and are, in the case shown, directed upwardly and backwardly in close proximity so the treatment materials are dispensed to the water as close to each other as possible. The orifice nozzles are best depicted in FIG. 9.

Each planing board 165 is attached to two supply pipes 193 and 195 pivotally secured to the front or bow of one of the pontoons 14 or 15 through an adjustable support arm 197 pivotally secured to the outboard bow portions of the pontoons 14 and 15. Alternatively, the pivoting arm 197 could be secured to the bow of the main tank 13. However, it is usually advantageous to secure the planing board assemblies to the vessel as far apart as possible or practical. The two supply pipes 193 and 195 provide not only conduits for treatment materials, but also the essential structure of a substantially rigid movable bipartite guide arm 198 for the planing board and spray bar assemblies 167 and 169.

The supply pipes 193 and 195 are connected through hose connection fittings 199 and 201 to feed hoses 203 and 205, shown diagrammatically, which at their opposite ends are connected respectively to feed connections 207 and 209. Feed connections 207 and 209 are attached respectively to an additional feed pipe 211 on the vessel connected into the feed line 55 of the vessel through additional three-way valve 213 and to hose connection 215 attached to three-way valve 215 mounted in feed line 55a.

When the vessel moves forward at a speed sufficient to cause effective planing action of the water upon the surfaces of the planing board 165 the depth of the planing board may be controlled through the lever 219 in the pilot house which lever is attached to a control cable 221 shown in FIG. 8 threaded through guide eyes 223 on the depth guide arm 198. The lower end of the cable is attached to a sliding pitch control fitting 220 which is slideable longitudinally on the guide arm 198. A short pitch control arm 222 is attached to the sliding pitch control fitting 220 at one end and at the other to a control vane 225 rigidly secured at its top to the bottom of the planing board 165 and pivotedly secured at its bottom to the end of the depth guide arm 198 through a pivot connection 227. As shown in FIG. 8, the end of the depth guide arm 198 preferably turns up at the lower end to properly position the pivot 227 and provide an arrangement whereby tension on the line control cable 221 will determine the essential angle of the planing board in the water and consequently the depth at which the spray bar assemblies 167 and 169 are maintained under the water at any given speed of the vessel. A skeg 224 is provided in the upward bend at the lower end of the depth guide arm 198. The skeg 224 strengthens the assembly at the end of the depth guide arm, maintains the curvature of the bend in the end of guide arm, and also serves as a vertical stabilizing means to keep the guide arm tracking uniformly through the water. Short hoses 229 and 231 serve to connect suitable fittings, not shown, on the end of the supply pipes 193 and 195 with similar hose connection fittings, also not shown, on the ends of spray pipes 185 and 187 respectively of spray bars 179 in spray bar assemblies 167 and 169. A spreader bar 233 is preferably provided between the depth guide arms 198 to ensure they are maintained the same distance apart at all times and to provide in conjunction with the skegs 224 better tracking through the water.

During operation of the apparatus it will be understood that one tank on the vessel will be charged or filled with aluminum sulfate while the other is preferably filled with sodium aluminate. When the material is to be dispensed to a lake or other body of water in which it has been predetermined that the phosphorus content is too elevated causing or threatening to cause or result in eutrophication of the lake waters, the vessel is passed consecutively back and forth across the lake with the planing board assemblies 161 and 163 deployed with the spray bar assemblies 167 and 169 extended from each planing board 165. The dual pumping systems in the vessel are operated at a rate determined by the speed of the vessel plus the depth of the water detected by the depth detection apparatus, as explained in connection with the previous figures, in accordance with the amount of treatment material, i.e. in the example provided, aluminum sulfate and also sodium aluminate, which has been predetermined as necessary for treatment of any given volume of the water. As the aluminum sulfate is dispensed into the water, it reacts immediately with the excess of water at the preferred pH of about 6 to 8 maintained by the sodium aluminate to form a flocculent mass of aluminum hydroxide which then immediately reacts as it settles slowly through the water to the bottom with phosphorus in the water forming insoluble aluminum phosphate plus entrapped phosphorus which settles with the floc to the bottom. A frequently used empirical ratio of alum to sodium aluminate is 1 to about 1.6 depending, however, upon the initial alkalinity and bufferin of the lake waters.

The flocculent mass upon settling upon the bottom blankets the bottom and retards redissolution of phosphorus from the bottom sediments into the water again. This is a very important function, commonly referred to as phosphorus inactivation, since redissolution is usually a very significant problem.

While the aluminum sulfate or alum can be dispensed in accordance with the invention by itself, it is preferable that a neutralizing or alkalizing agent such as sodium aluminate be dispensed at the same time. This is desirable to make certain, particularly in lakes and the like which may already be exposed to acid rain and the like and in which the natural buffering in the lake waters may be rather easily overcome, that the water is not quickly driven to excess acidity. The sodium aluminate will consequently be dispensed at the same time through one of the two adjoining spray pipes 185 or 187 in the spray bar assemblies 165 and 167. Such dispensing of sodium aluminate will also be based upon the original pH of the water plus the amount of aluminum sulfate dispensed and/or the volume of water passed over as determined by the method of the invention. In addition, it may be desirable in some lakes to take continuous pH readings with vessel mounted pH meters as explained previously with respect to the neutralization of acid lakes and the like.

As mentioned above, an aluminum hydroxide floc when it settles to the bottom of a lake or other relatively still body of water has the further advantage of partially sealing the bottom to prevent redissolution of phosphorus from the bottom sediments into the overlying water. Too little floc will not effectively retard redissolution of phosphorus while too thick a blanket may kill beneficial water organisms. It is important, therefore, that the correct thickness of material be applied to the bottom. It is thus often important to apply treatment agent not only on the basis of volume of water treated, but also on the basis of the absolute area of the bottom. The absolute area of the bottom will vary, however, depending upon the contour and relative roughness of the bottom. In other words, the absolute area of the bottom will be greater than the surface area of the overlying water if the bottom is other than perfectly flat. While the difference may not be great if the slope is not great, a fairly moderate slope may make a significant difference in material to be dispensed where the application rate is fairly critical.

Figure 10:
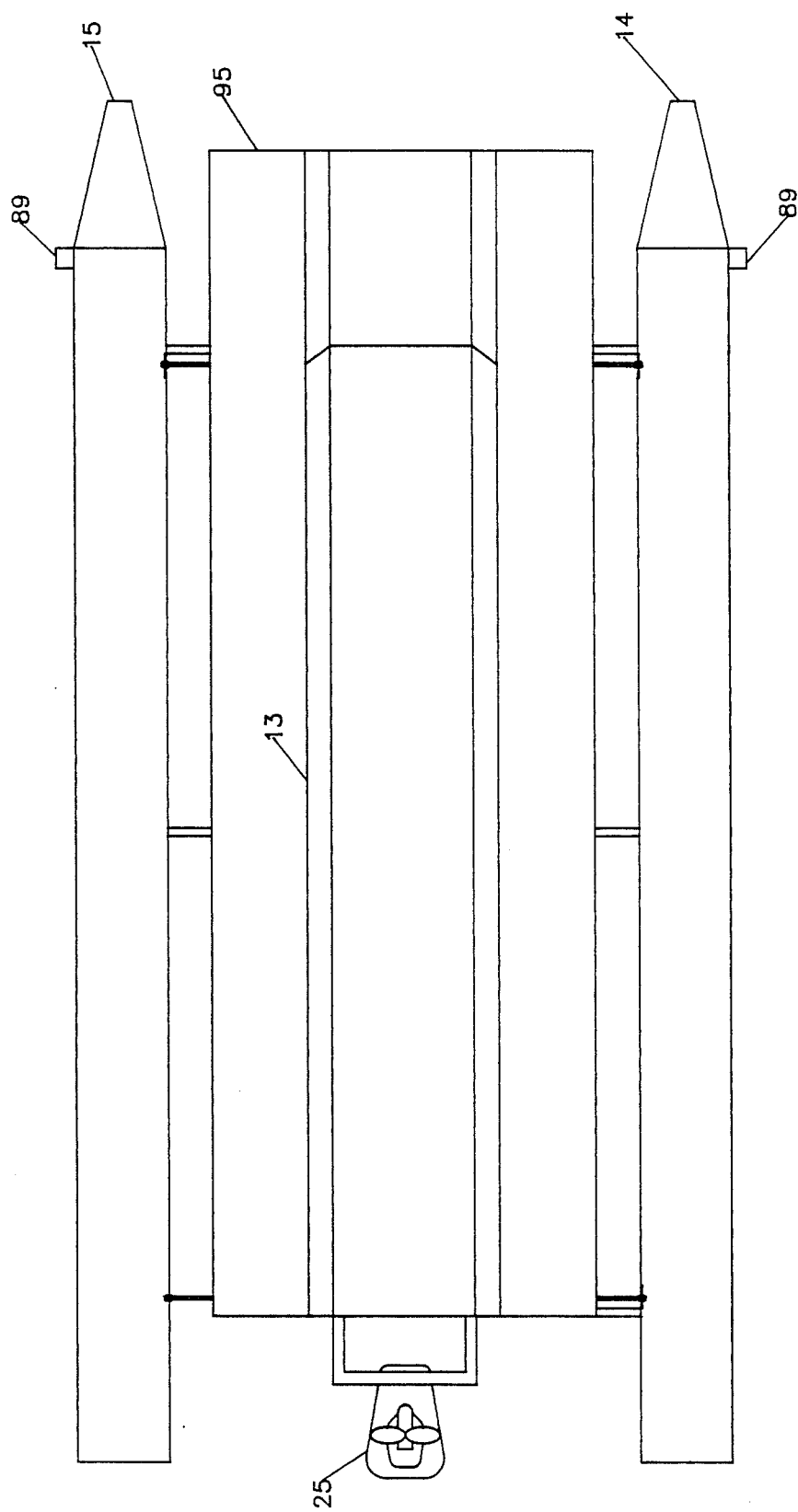
FIG. 10 is a bottom view of the vessel of the invention showing in particular in a preferred embodiment, the positioning of depth detectors at the bow of each pontoon.

It has been discovered that the bottom slope can be relatively simply determined by taking several readings with depth indicators. For example, if a series of consecutive depth readings are taken as the vessel moves across the lake surface, the lake bottom contour in the direction of the progress of the vessel can be calculated by simple triangulation in accordance with the change in water depth with continuing movement. This, however, will not provide any indication of the side to side slope. However, if depth transducers 89 are provided on at least the outer surfaces of the bow or stern of each of the pontoons 14 and 15 as shown particularly in FIG. 10, which is a bottom, or fish eye, view of the bottom of the vessel and pontoons in extended position with depth detectors on the bow, the difference in depth detected by the detectors on the two pontoons can be used to calculate the transverse contour of the bottom, while the difference between consecutive readings as the vessel moves forward can be used to determine the bottom contour in the direction of movement of the vessel. Alternatively detectors can be provided both at the bow and the stern of the pontoons. The depth transducers will usually be activated one at a time in serial fashion in a rapidly repeating pattern in order that the signal from each will not be confused with the signal from another. However, the signals can be closely spaced so that the bottom depth can be substantially instantaneously or simultaneously determined at least on a macro scale. These detectors can also be arranged in a triangle, two sides of which are preferably parallel with and substantially also coextensive with the longitudinal and transverse dimensions of the vessel. The positioning of the detectors, in other words, can be arranged in a grid or a portion of a grid the simplest embodiment of which is a triangle and the next simplest embodiment of which is a rectangle, if substantially simultaneous signals are used as detection signals. The two calculations, i.e. between the depth indication at the bow and stern and the port and starboard sides, can be combined to find the true slope of the bottom. Two detectors are, however, sufficient to calculate the slope if the progress of the vessel is taken advantage of to obtain horizontally displaced depth detection signals in the direction of travel. The area of the bottom can then be calculated taking into account the slope after calculating such slope from data supplied from the simplest arrangement of two detectors, for example, as follows, by a suitable computer:

Preliminary Definition of Variables

D1—Present depth reading from port depth sounder.
D1L—Last depth reading from port depth sounder.
D2—Present depth reading from starboard sounder.
D2L—Last depth reading from starboard sounder.
S—Boat speed at time of present depth reading.
SL—Speed at time of last depth reading.
T—Time at present depth reading.
TL—Time at last depth reading.
X—Distance between port and starboard depth readings.

Then $$WL = \sqrt[2]{(D1L - D2L)^2 + X^2}$$

$$W = \sqrt[2]{(D1 - D2)^2 + X^2}$$

-continued $$Y1 = \sqrt[2]{(D1 - D1L)^2 + \left((T - TL) \times \frac{(S + SL)}{2}\right)^2}$$

$$Y2 = \sqrt[2]{(D2 - D2L)^2 + \left((T - TL) \times \frac{(S + SL)}{2}\right)^2}$$

The Area of the bottom can be closely approximated by the following formula as the distance between the depth readings becomes small using the following formula:

$$\text{Area} = \frac{WL \times Y1 + W \times Y2}{2}$$

If the bottom is rough this fact will be made evident by rapidly changing and usually erratically distributed contour indications or signals as the treatment vessel progresses over the surface, the magnitude of the variation providing an indication of how rough or uneven the bottom is.

As indicated above, it is desirable to blanket the bottom with a floc layer to prevent resolution of phosphorus from bottom sediments into the water above. Such blanketing is commonly referred to as phosphorus inactivation. However, floc, being light and fluffy, is easily disturbed by underwater currents or wave action and is also rather easily subject to sliding down slopes of significant inclination. Such surging or avalanching on slopes, which need not be particularly steep, exposes the bottom sediments and has been found to allow resolution of phosphorus into the overlying water.

Because of the effect of surging or avalanching of the floc on significant slopes, it is important to determine the bottom slope and this is quickly and conveniently done by the use of the special spaced detectors on the hull or pontoons of the application vessel. Where a fairly steep slope is encountered, it may be desirable to treat such slope with another material than alum, for example, limestone or the like. A heavy coating of particulate limestone will tend to form a crust which is not so readily disturbed and also very effectively alkalizes the bottom sediments preventing resolution of toxic heavy metals from the sediment.

Where the waters and bottom of a lake is to be treated specifically to remove and prevent resolution of toxic heavy metals such as copper and cadmium or to prevent the solution of aluminum in the water, aluminum itself being toxic to aquatic life at pH's less than about 6, it is necessary to prevent acidic conditions. It is desirable to maintain the pH of the water at a pH of from about 6 to 9 to prevent resolution of aluminum from any floc laid down. Sometimes it may also be desirable, particularly in the case of blocking the solution or resolution of toxic heavy metals, to dispense into lake waters both hydrated lime and limestone particulates. The hydrated lime provides an immediate increase in pH to the water and the bottom sediment, while the limestone provides longer term buffering protection. Other similar dual materials may be added simultaneously to the water. Basically, however, different components will usually be simultaneously added to the water where it is wished to take advantage of differential solubilities or where a reaction is desired in the lake waters rather than in the vessel tanks. This is the reason for adding alum and sodium aluminate separately, since the heavy floc which forms when the two are mixed would be very difficult if not impossible to pump through a dispensing system.

A large number of materials can be added to aquatic and marine environments in accordance with the present invention. Among these are the following more notable examples:

(a) Aluminum bearing materials, both compounds and mixtures, usually added for the control of phosphorus in waters subject to possible eutrophication
  (1) alum (in the form of aluminum sulfate)
  (2) sodium aluminate
  (3) aluminum hydroxide
  (4) hydrated alumina
  (5) activated alumina
  (6) clays (including both natural, ground and heat treated clays)

(b) Iron bearing compounds also used in some cases for phosphorus removal
  (1) ferric aluminum sulfate
  (2) gamma iron oxide (c) Alkaline materials suitable in some cases for removing phosphorus and also for neutralizing acid water conditions:
  (1) limestone
  (2) calcite (calcitic limestone)
  (3) magnesite
  (4) dolomite
  (5) lime (calcia, CaO)
  (6) quicklime (hydrated lime)
  (7) magnesia (MgO)

(d) Alkali metal compounds useful for neutralizing acid lake conditions
  (1) soda ash and sodium carbonate
  (2) sodium bicarbonate (e) Acid materials to correct excessively alkaline conditions:
  (1) hydrochloric acid
  (2) sulfuric acid
  (3) nitric acid
  (4) acetic acid (f) Nutrient and other materials used for increasing phyto plankton growth to support increased fish and other aquatic bioflora production
  (1) phosphates
  (2) nitrates
  (3) limestone (frequently added with (a) and (b)

(g) Chemical and biological addition agents to control unrestrained growth of biomass such as macro weeds and the like
  (1) algaecide
    (i) copper sulfate
  (2) herbicide
  (3) selective biological agents such as bacteria, viruses and fungi (h) Adsorbents for removing toxic materials
  (1) carbon block (i) Coagulants
  (1) alum
  (2) magnesium bicarbonate (j) Dispersants to disperse other materials in water
  (1) trisodium phosphate
  (2) sodium silicate
  (3) polyacrylates (k) Ion exchange and other chemical agents and materials for selective removal of chemical compounds and other moieties (1) zeolites
(2) chelating agents
(l) Reductants
(1) various iron bearing compounds
(m) Oxidizers
(1) oxgen bearing compounds
(n) Disinfectants
(1) chlorine bearing compounds
(o) Pesticides
(1) various commercial water soluble pesticides suitable for application to lakes and the like are available
(p) Medicinals
(1) antibiotics for treating aquatic organisms
(2) chemical treatment agents All of the above chemical or biological imbalance treatment agents will usually be applied to lakes and other bodies of water either volumetrically or in accordance with bottom area and are, therefore, likely candidates for application in accordance with the method of the applicant and the apparatus of the present invention for practicing such invention. The various materials may be added in liquid, powder, or granular particulte form. Liquid, fluent colloidal and liquid suspension or slurry type materials are, in general, the most satisfactory. In each case the agents listed above will be placed in the tanks of the vessel or the tanks of the appended pontoons or possibly in, for example, the application of a gaseous treatment agent, in special pressure tanks provided on the deck or elsewhere in the vessel, and will then be discharged or dispensed into the water generally as described in some detail hereinbefore for the application of either neutralization agents or the application of phosphorus controlling agents to a body of water.

As will be evident from the foregoing discussion, a number of treatment options are available with the method and apparatus of the present invention. Treatment materials can be applied both to the surface of a lake and below the surface and can be accurately applied based both upon the volume of water passed over and the area of the bottom passed over which, it will readily be understood, are not usually directly related. The versatility of the apparatus using the detector arrangements described is very great. For example, with simultaneous detection and determination of the volume of water passed over and the area of the bottom passed over which area has preferably, but not necessarily, been adjusted for the slope of the bottom, the following different treatment options are possible with this dual material, dual spray bar application system:
1. one material, surface spray only,
2. one material, sub-surface spray only,
3. two materials, surface spray only, simultaneously,
4. two materials, sub-surface spray only, simultaneously,
5. one material, combined surface and sub-surface spray,
6. two materials, combined surface and sub-surface spray,
7. two materials, one surface spray only, the other sub-surface spray only.

In addition, different algorithms can be used for controlling the dose directed to either spray bar:
1. two materials, both applied by water volume,
2. one material applied by volume, the other by surface area,
3. one material applied by volume, the other by volume plus surface area,
4. one material applied by surface area, the other by volume plus surface area,
5. both materials applied by surface area,
6. both materials applied by volume plus surface area.

While the invention has been described and illustrated in the drawings with reference to the application or dispensing of a slurry to the surface of a lake or other body of water, it will be understood that a slurry, solution, powder or other physical form of treatment agent may be dispensed with suitable equipment to the body of water either above or below the surface.

As used herein the following terms have the listed meanings:
(a) computer means refers to any type of computer or control means or combinations of control means and/or computer which can effectively maintain a continuing control of the application or dispensing of a treatment agent to a body of water based upon contemporaneously obtained and processed data,
(b) "substantially continuously" when used in connection with the detection and processing of data by a computer means refers to the collection of data on a regular basis at closely spaced intervals as well as continuously and includes serial as well as simultaneous processing at a rate sufficient to maintain substantially continuous control of the application of treatment agents using contemporaneously obtained data,
(c) spray means refers not only to conventional spray means such as shown in the appended drawings but also to any type of dispensing means for continuous or substantially continuous application of a treatment agent or agents to a body of water and includes application of the treatment agent in any substantially continuous form such as a slurry, solution or powder not only to the surface of the water, but dispensing under the surface as well,
(d) a floating means or floating spray transport or platform means as used herein refers to any ship, vessel, boat, catamaran, pontoon or other type of buoyant support which can effectively carry materials to be dispensed and be driven or accurately directed or sailed across the surface of or below the surface of a body of water on a uniform coarse while discharging or dispensing such materials,
(e) sparging means the continuous or periodic recirculation by pumping of a slurry type material in order to prevent the slurry particles from settling out of or otherwise dissociating from the liquid carrier medium and/or to maintain the material in a reasonably well mixed condition,
(f) predetermined chemical imbalance means any deviation from the normal chemical balance of water in a lake or other body of water which may be rectified or treated by means of a chemical treatment agent applied to such body of water after such imbalance is discovered or determined,
(g) predetermined biological imbalance means any deviation from the normal biological or desired biological balance of water in a lake or other body of water which may be rectified or treated by means of a chemical or biological treatment agent applied to such body of water after such imbalance is discovered or determined,
(h) aquatic environment means an underwater environment or locale defined by a body of water or a portion of a body of water including marine environments and refers to any and all components of such environment including both those normally thought of as chemical components, constituents and characteristics and biological constituents such as organisms in such aquatic environment, (i) predetermined constituent imbalance means any deviation from normal or a desired balance of either the chemical or biological composition or constituents of an aquatic environment, (j) fluent matter or fluent treatment agent means a material which flows and can be pumped or directed through pipes and the like such as a liquid, solution, slurry, powder, light colloidal or other suspension. Usually these will include the characteristic or ability to develop an upper limiting surface, but not necessarily as the dispensing of gaseous and gaseous suspension treatment agents under appropriate circumstances is not intended to be excluded, and (k) associated transversely extended fluent material dispensing means is intended to mean a dispensing means extended to the side of a floating means with respect to the line of travel extending either from the side of the floating means or from a means under the water or above and towed by or attached to the floating means.

While the present invention has been described at some length and with some particularity with regard to several embodiments, it is not intended that the invention be limited to any such particulars or embodiments, but it is to be construed broadly with reference to the appended claims so as to provide the broadest possible interpretation of such claims in view of the prior art and thereby to effectively encompass the intended scope of the invention.

I claim:

1. A method comprising: treating an aquatic environment bonded by at least in part a sloping bottom to redress a predetermined constituent imbalance in said environment by dispensing to said environment for providing a uniform coating on said bottom of a fluent treatment agent by:
   (a) directing a floating means across the surface of said body of water, said floating means having associated therewith transversely extended fluent material dispensing means and feed means for said dispensing means,
   (b) determining the velocity of movement of such floating means,
   (c) substantially continuously determining the depth of water under the floating means by at least two on-board depth detection means arranged in an extended transverse pattern,
   (d) substantially continuously processing the velocity and depth data to determine the slope of the bottom from the depth detected under each depth detector at any given time and determining from such slope substantially the actual bottom surface area over which the floating means and associated fluent material dispensing means passes,
   (e) adjusting the feed means to said fluent material dispensing means to dispense a predetermined amount of at least one fluent treatment agent into said body of water proportionally related to the actual bottom surface area over which the floating means passes to correct such imbalance at least in part by providing material to the bottom.

2. A method in accordance with claim 1 wherein the volume of water passed over is also determined and the feed means adjusted so as to dispense the treatment agent in accordance with the volume of water over which the floating means and associated fluent material dispensing means passes as well as the actual bottom surface area.

3. A method in accordance with claim 2 wherein there are two treatment agents dispensed, one of which is dispensed in accordance with the bottom surface area and one of which is dispensed in accordance with the volume of water over which the floating means passes.

* * * * *

UNITED STATES PATENT AND TRADEMARK OFFICE
CERTIFICATE OF CORRECTION

PATENT NO. : 4,818,416

DATED : April 4, 1988

INVENTOR(S) : Thomas E. Eberhardt

It is certified that error appears in the above-identified patent and that said Letters Patent is hereby corrected as shown below:

Col. 29, line 39, (line 2 of claim 1) "bonded" should read --bounded--.

Signed and Sealed this

Eighteenth Day of May, 1993

Attest:

MICHAEL K. KIRK

*Attesting Officer*  Acting Commissioner of Patents and Trademarks